(12) United States Patent
Lee et al.

(10) Patent No.: US 12,387,725 B2
(45) Date of Patent: Aug. 12, 2025

(54) ELECTRONIC DEVICE AND METHOD FOR RECOMMENDING VOICE COMMAND THEREOF

(71) Applicant: Samsung Electronics Co., Ltd., Gyeonggi-do (KR)

(72) Inventors: Yoonju Lee, Gyeonggi-do (KR); Jaeyung Yeo, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 305 days.

(21) Appl. No.: 18/082,179

(22) Filed: Dec. 15, 2022

(65) Prior Publication Data

US 2023/0197077 A1 Jun. 22, 2023

Related U.S. Application Data

(63) Continuation of application No. PCT/KR2022/020468, filed on Dec. 15, 2022.

(30) Foreign Application Priority Data

Dec. 16, 2021 (KR) .......................... 10-2021-0180326

(51) Int. Cl.
*G10L 15/22* (2006.01)
*G10L 15/04* (2013.01)
*G10L 15/18* (2013.01)

(52) U.S. Cl.
CPC .............. *G10L 15/22* (2013.01); *G10L 15/04* (2013.01); *G10L 15/1815* (2013.01);
(Continued)

(58) Field of Classification Search
CPC ..... G10L 15/22; G10L 15/04; G10L 15/1815; G10L 2015/223; G10L 2015/227; G10L 2015/228
See application file for complete search history.

(56) References Cited

U.S. PATENT DOCUMENTS 8,666,730 B2    3/2014  Todhunter et al.
9,183,196 B1 *  11/2015 Uszkoreit ............. G06F 40/211
(Continued)

FOREIGN PATENT DOCUMENTS

JP   2005-341182 A   12/2005
JP   2006-11036 A    1/2006
(Continued)

OTHER PUBLICATIONS

International Search Report dated Mar. 24, 2023.

*Primary Examiner* — Abul K Azad
(74) *Attorney, Agent, or Firm* — Cha & Reiter, LLC.

(57) ABSTRACT

According to certain embodiments, an electronic device comprises: a display; a communication circuit; a memory; and at least one processor operatively connected to the display, the communication circuit, and the memory, wherein the memory stores instructions, when executed by the at least one processor, cause the electronic device to perform a plurality of operations, the plurality of operations comprising: splitting a sentence included in a message in units of action, the sentence being provisioned to a user by the electronic device, thereby resulting in a split action-unit sentence; converting the split action-unit sentence into a form of a voice command; determining whether an operation corresponding to the voice command can be performed, based on at least one of user information, information related to the electronic device, and information related to an external execution device connected to the electronic device; and providing at least one recommended voice command corresponding to the operation, based on the determination.

20 Claims, 18 Drawing Sheets

(52) U.S. Cl.
CPC .. *G10L 2015/223* (2013.01); *G10L 2015/227* (2013.01); *G10L 2015/228* (2013.01)

(56) References Cited

U.S. PATENT DOCUMENTS

| | | | |
|---|---|---|---|
| 10,109,270 | B2 | 10/2018 | Sharifi et al. |
| 10,192,549 | B2 | 1/2019 | Kannan et al. |
| 10,440,167 | B2 | 10/2019 | Choi et al. |
| 10,453,441 | B2 | 10/2019 | Sharifi et al. |
| 10,547,729 | B2 | 1/2020 | Choi et al. |
| 10,553,210 | B2 | 2/2020 | Chung et al. |
| 10,692,491 | B2 | 6/2020 | Sisodia et al. |
| 10,827,067 | B2 | 11/2020 | Liu |
| 10,846,109 | B2 | 11/2020 | Krishna et al. |
| 10,878,188 | B2 | 12/2020 | Zhang et al. |
| 10,923,100 | B2 | 2/2021 | Sharifi et al. |
| 11,146,670 | B2 | 10/2021 | Choi et al. |
| 11,308,944 | B2 * | 4/2022 | Tan .................. G06F 16/90332 |
| 11,403,123 | B2 | 8/2022 | Krishna et al. |
| 11,756,539 | B2 | 9/2023 | Chung et al. |
| 2004/0044516 | A1 * | 3/2004 | Kennewick ......... G10L 15/1822 704/E15.04 |
| 2010/0235165 | A1 | 9/2010 | Todhunter et al. |
| 2013/0275164 | A1 * | 10/2013 | Gruber .................. G06Q 10/02 705/5 |
| 2014/0244258 | A1 * | 8/2014 | Song ....................... G10L 15/18 704/249 |
| 2016/0155442 | A1 | 6/2016 | Kannan et al. |
| 2017/0069315 | A1 | 3/2017 | Chung et al. |
| 2019/0074016 | A1 * | 3/2019 | Orr ....................... G05B 15/02 |
| 2019/0188013 | A1 | 6/2019 | Krishna et al. |
| 2019/0294452 | A1 * | 9/2019 | Herring, Jr. ........... G06F 3/0482 |
| 2021/0043108 | A1 | 2/2021 | Baumback et al. |
| 2022/0318039 | A1 | 10/2022 | Krishna et al. |
| 2023/0377577 | A1 | 11/2023 | Chung et al. |

FOREIGN PATENT DOCUMENTS

| | | |
|---|---|---|
| JP | 2018-506758 A | 3/2018 |
| KR | 10-2247504 B1 | 5/2021 |
| KR | 10-2021-0120960 A | 10/2021 |
| WO | WO-2016120904 A1 * | 8/2016 ........... G06F 17/271 |

* cited by examiner

"TELL ME RECIPE FOR KIMCHI RAMEN" ~810

RECIPE INGREDIENTS:
1 SPICY RAMEN, 1/2 BOWL SOUR KIMCHI, 1/5 GREEN ONION,
1 CHILLI PEPPER, 1/3 TBSP COARSE CHILLI POWDER,
1 TBSP SESAME OIL, 1 TBSP SESAME ~815

COOKING ORDER:
1. PREPARE SOUR KIMCHI BY CUTTING IT WITH SCISSORS, PLEASE. ~821
2. CHOP GREEN PEPPER AND GREEN ONION INTO THIN SLICES, PLEASE. ~822
3. PREPARE SPICY RAMEN, PLEASE. ~823
4. POUR 550 ML OF WATER AND PUT SOUP POWDER AND INGREDIENTS, PLEASE. ~824
5. WHEN BOILED WATER BUBBLED OUT ON EDGE, ADD KIMCHI, PLEASE. ~825
6. ADD CHILLI POWDER FOR COLOR OF FOOD, PLEASE. YOU DON'T NEED TO ADD CHILLI POWDER TO RAMEN. ~826 / ~820
7. WHEN NOODLES ARE HALF COOKED, ADD GREEN ONION AND GREEN CHILLI PEPPER, PLEASE. ~827
8. BOIL NOODLES FOR ABOUT 2 MINUTES, PLEASE. ~828
9. PUT 1 TBSP OF SESAME OIL IN BOWL, PLEASE. ~829
10. PUT WELL-COOKED RAMEN IN BOWL AND ADD MASHED SESAME SEEDS, PLEASE ~8210
11. IT'S FRESH SOUP WITH KIMCHI. I LIKE TO COOK IT SIMPLY TO RELIEVE HANGOVER. BECAUSE IT INCLUDES SESAME OIL, IT DOES NOT HURT MY STOMACH MUCH AND IT IS SOFT. ~8211

```
SENTENCE SPLIT IN UNITS OF ACTION

PREPARE SOUR KIMCHI BY CUTTING IT WITH SCISSORS, PLEASE. ~831
CHOP GREEN PEPPER AND GREEN ONION INTO THIN SLICES, PLEASE. ~832
PREPARE SPICY RAMEN, PLEASE. ~833
POUR 550 ML OF WATER AND ~834
PUT SOUP POWDER AND INGREDIENTS, PLEASE. ~835
WHEN BOILED WATER BUBBLED OUT ON EDGE, ADD KIMCHI, PLEASE. ~836
ADD CHILLI POWDER FOR COLOR OF FOOD, PLEASE. ~837
YOU DON'T NEED TO ADD CHILLI POWDER TO RAMEN. ~838
WHEN NOODLES ARE HALF COOKED, ADD GREEN ONION AND ~839
GREEN CHILLI PEPPER, PLEASE.
BOIL NOODLES FOR ABOUT 2 MINUTES, PLEASE. ~8310
PUT 1 TBSP OF SESAME OIL IN BOWL, PLEASE. ~8311
PUT WELL-COOKED RAMEN IN BOWL AND ~8312
ADD MASHED SESAME SEEDS, PLEASE. ~8313
IT'S FRESH SOUP WITH KIMCHI. ~8314
I LIKE TO COOK IT SIMPLY TO RELIEVE HANGOVER. ~8315
BECAUSE IT INCLUDES SESAME OIL, IT DOES NOT HURT MY ~8316
STOMACH MUCH AND IT IS SOFT.
```

```
CONVERTED SENTENCE

PREPARE SOUR KIMCHI BY CUTTING IT WITH SCISSORS ~851
CHOP GREEN PEPPER AND GREEN ONION INTO THIN SLICES ~852
PREPARE SPICY RAMEN ~853
POUR 550 ML OF WATER AND ~854
PUT SOUP POWDER AND INGREDIENTS ~855
WHEN BOILED WATER BUBBLED OUT ON EDGE, ADD KIMCHI ~856
ADD CHILLI POWDER FOR COLOR OF FOOD ~857
YOU DON'T NEED TO ADD CHILLI POWDER TO RAMEN ~858
WHEN NOODLES ARE HALF COOKED, ADD GREEN ONION AND GREEN CHILLI PEPPER ~859
START 2-MINUTE TIMER ~8510
PUT 1 TBSP OF SESAME OIL IN BOWL ~8511
PUT WELL-COOKED RAMEN IN BOWL ~8512
ADD MASHED SESAME SEEDS ~8513
~~IT'S FRESH SOUP WITH KIMCHI.~~ ~8514
~~I LIKE TO COOK IT SIMPLY TO RELIEVE HANGOVER~~ ~8515
~~BECAUSE IT INCLUDES SESAME OIL, IT DOES NOT HURT~~ ~8516
~~MY STOMACH MUCH AND IT IS SOFT~~
```

```
RESULT OF NL

PREPARE SOUR KIMCHI BY CUTTING IT WITH SCISSORS → rejected  ~871
CHOP GREEN PEPPER AND GREEN ONION INTO THIN SLICES → rejected  ~872
PREPARE SPICY RAMEN → rejected  ~873
POUR 550 ML OF WATER → DeviceControl/DispenceWaterPurifier  ~874
PUT SOUP POWDER AND INGREDIENTS → rejected  ~875
WHEN BOILED WATER BUBBLED OUT ON EDGE, ADD KIMCHI → rejected  ~876
ADD CHILLI POWDER FOR COLOR OF FOOD → rejected  ~877
YOU DON'T NEED TO ADD CHILLI POWDER TO RAMEN → rejected  ~878
WHEN NOODLES ARE HALF COOKED, ADD GREEN ONION AND  ~879
GREEN CHILLI PEPPER → rejected
START 2-MINUTE TIMER → Clock/StartTimer  ~8710
PUT 1 TBSP OF SESAME OIL IN BOWL → rejected  ~8711
PUT WELL-COOKED RAMEN IN BOWL → rejected  ~8712
ADD MASHED SESAME SEEDS → rejected  ~8713
~~IT'S FRESH SOUP WITH KIMCHI.~~  ~8714
~~I LIKE TO COOK IT SIMPLY TO RELIEVE HANGOVER.~~  ~8715
~~BECAUSE IT INCLUDES SESAME OIL, IT DOES NOT HURT~~  ~8716
~~MY STOMACH MUCH AND IT IS SOFT.~~
```

```
RESULT OF INPUT EVALUATION

PREPARE SOUR KIMCHI BY CUTTING IT WITH SCISSORS → rejected  ~891
CHOP GREEN PEPPER AND GREEN ONION INTO THIN SLICES → rejected  ~892
PREPARE SPICY RAMEN → rejected  ~893
POUR 550 ML OF WATER → Success  ~894
PUT SOUP POWDER AND INGREDIENTS → rejected  ~895
WHEN BOILED WATER BUBBLED OUT ON EDGE, ADD KIMCHI → rejected  ~896
ADD CHILLI POWDER FOR COLOR OF FOOD → rejected  ~897
YOU DON'T NEED TO ADD CHILLI POWDER TO RAMEN → rejected  ~898
WHEN NOODLES ARE HALF COOKED, ADD GREEN ONION AND  ~899
GREEN CHILLI PEPPER → rejected
START 2-MINUTE TIMER → Success  ~8910
PUT 1 TBSP OF SESAME OIL IN BOWL → rejected  ~8911
PUT WELL-COOKED RAMEN IN BOWL → rejected  ~8912
ADD MASHED SESAME SEEDS → rejected  ~8913
IT'S FRESH SOUP WITH KIMCHI.  ~8914
I LIKE TO COOK IT SIMPLY TO RELIEVE HANGOVER  ~8915
BECAUSE IT INCLUDES SESAME OIL, IT DOES NOT HURT  ~8916
MY STOMACH MUCH AND IT IS SOFT.
```

FIG.8E

ELECTRONIC DEVICE AND METHOD FOR RECOMMENDING VOICE COMMAND THEREOF

CROSS-REFERENCE TO RELATED APPLICATION(S)

This application is a continuation of International Application No. PCT/KR2022/020468, filed on Dec. 15, 2022, which claims priority to Korean Patent Application No. 10-2021-0180326, filed on Dec. 16, 2021, in the Korean Intellectual Property Office, the disclosure of which is herein incorporated by reference in its entirety.

BACKGROUND

1. Field

Embodiments disclosed in this specification relate to a technology for recommending an available voice command to a user.

2. Description of Related Art

Nowadays, with speech recognition technology, a speech recognition function may be implemented in various electronic devices. The intelligent assistance service may infer a user's intent by performing natural language processing on the user's utterance, and may allow a control device to be controlled based on the inferred intent of the user.

In an electronic device supporting an intelligent assistance service, a user may not easily perceive an available voice command depending on a state of the electronic device. Accordingly, there is a need for a technology for notifying the user of the available voice command in the electronic device.

Certain embodiments of the disclosure provide an electronic device capable of providing a user with a recommended voice command, which is capable of being used, in relation to a message being provided, and a method thereof.

SUMMARY

According to certain embodiments, an electronic device comprises: a display; a communication circuit; a memory; and at least one processor operatively connected to the display, the communication circuit, and the memory, wherein the memory stores instructions, when executed by the at least one processor, cause the electronic device to perform a plurality of operations, the plurality of operations comprising: splitting a sentence included in a message in units of action, the sentence being provisioned to a user by the electronic device, thereby resulting in a split action-unit sentence; converting the split action-unit sentence into a form of a voice command; determining whether an operation corresponding to the voice command can be performed, based on at least one of user information, information related to the electronic device, and information related to an external execution device connected to the electronic device; and providing at least one recommended voice command corresponding to the operation, based on the determination.

According to an embodiment, an electronic device comprises: a communication circuit; a memory; and at least one processor operatively connected to the communication circuit and the memory, wherein the memory stores instructions, when executed by the at least one processor, cause the electronic device to perform a plurality of operations, the plurality of operations comprising: receiving information about a message, wherein the message is provided by an external electronic device, from the external electronic device through the communication circuit; splitting a sentence included in the message in units of action based on the information about the message, thereby resulting in a split action-unit sentence; converting the split action-unit sentence into a form of a voice command; determining whether an operation corresponding to the voice command can be performed, based on at least one of user information, information related to the external electronic device, and information related to an external execution device connected to the external electronic device; determining at least one recommended voice command corresponding to the operation, based on the determination; and providing the at least one recommended voice command to the external electronic device through the communication circuit.

According to an embodiment, a voice command recommending method of an electronic device, comprises: splitting a sentence included in a message in units of action, the sentence being provisioned to a user by the electronic device, thereby resulting in a split action-unit sentence; converting the split action-unit sentence into a form of a voice command; determining whether an operation corresponding to the voice command can be performed, based on at least one of user information, information related to the electronic device, and information related to an external execution device connected to the electronic device; and providing at least one recommended voice command corresponding to the operation, based on the determination.

According to certain embodiments, a voice command recommending method of an electronic device comprises: receiving information about a message, wherein the message is provided by an external electronic device, from the external electronic device; splitting a sentence included in the message in units of action based on the information about the message, thereby resulting in a split action-unit sentence; converting the split action-unit sentence in a form of a voice command; determining whether an operation corresponding to the voice command can be performed, based on at least one of user information, information related to the external electronic device, and information related to an external execution device connected to the external electronic device; determining at least one recommended voice command corresponding to the operation, based on the determination; and providing the external electronic device the at least one recommended voice command.

BRIEF DESCRIPTION OF THE DRAWINGS

FIGS. 8A to 8F are diagrams for describing an operation of an electronic device, according to an embodiment.

With regard to description of drawings, the same or similar components will be marked by the same or similar reference signs.

DETAILED DESCRIPTION

According to embodiments disclosed in this specification, an electronic device may provide a user with a recommended voice command. The recommended voice command is capable of being used, in relation to a message (e.g., a screen or voice) being provided.

According to embodiments disclosed in this specification, a voice command corresponding to operations capable of being continuously performed may be recommended in relation to a response message to a user's voice input.

According to embodiments disclosed in this specification, a voice command suitable for a current situation may be recommended for various domains regardless of a domain currently entered by an electronic device.

Besides, a variety of effects directly or indirectly understood through the specification may be provided.

Electronic Device

Figure 1:
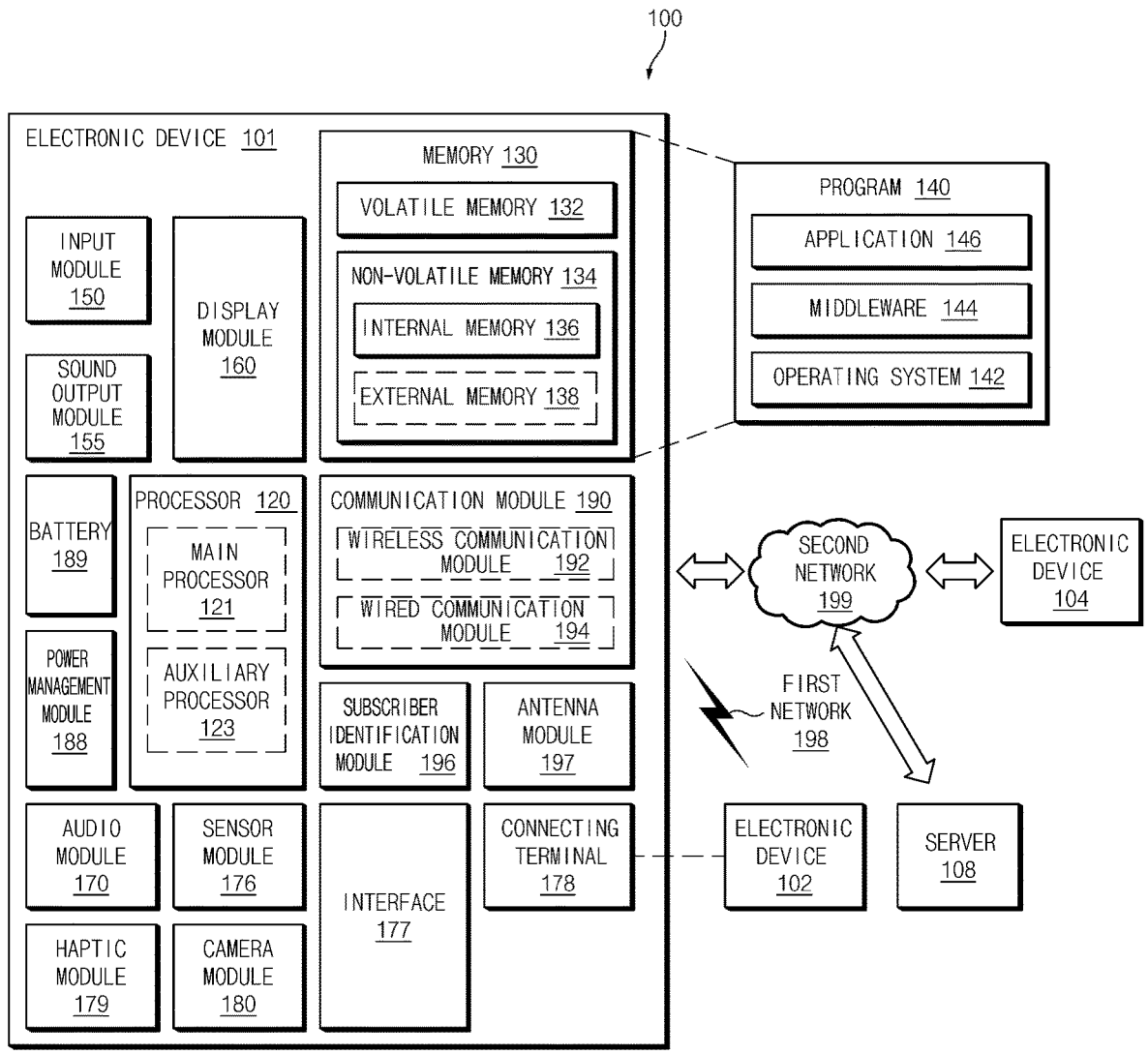
FIG. 1 is a block diagram illustrating an electronic device 101 in a network environment 100 according to certain embodiments.

FIG. 1 is a block diagram illustrating an electronic device 101 in a network environment 100 according to certain embodiments. Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thererto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to certain embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIDI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2:
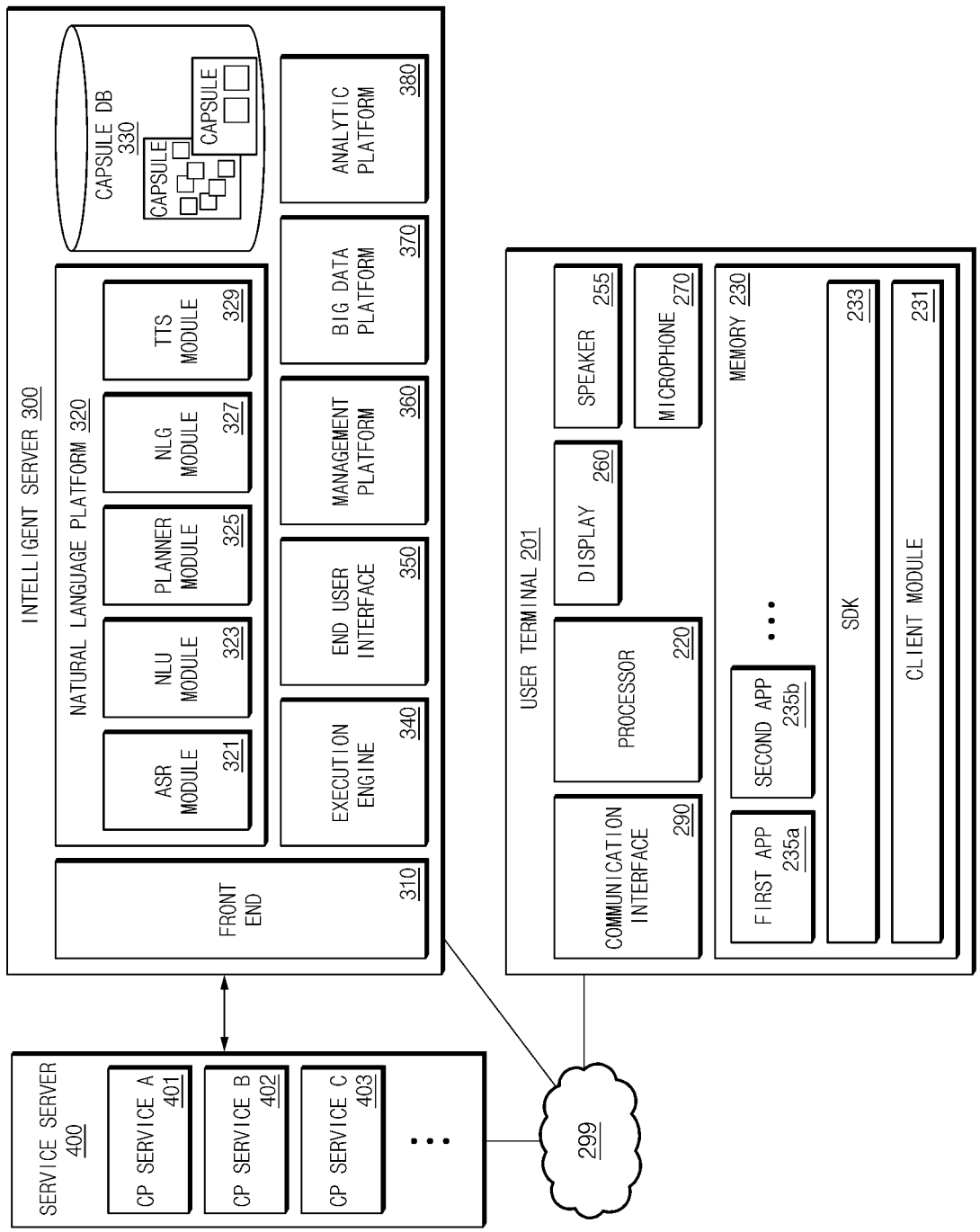
FIG. 2 is a block diagram illustrating an integrated intelligence system, according to an embodiment.

FIG. 2 is a block diagram illustrating an integrated intelligence system, according to an embodiment.

Referring to FIG. 2, an integrated intelligence system according to an embodiment may include a user terminal 201, an intelligence server 300, and a service server 400.

The user terminal 201 according to an embodiment may be a terminal device (or an electronic device) capable of connecting to Internet, and may be, for example, a mobile phone, a smartphone, a personal digital assistant (PDA), a notebook computer, a television (TV), a household appliance, a wearable device, ahead mounted display (HMD), or a smart speaker.

According to the illustrated embodiment, the user terminal 201 may include a communication interface 290, a microphone 270, a speaker 255, a display 260, a memory 230, or a processor 220. The listed components may be operatively or electrically connected to one another.

The communication interface 290 according to an embodiment may be connected to an external device and may be configured to transmit or receive data to or from the external device. The microphone 270 according to an embodiment may receive a sound (e.g., a user utterance) to convert the sound into an electrical signal. The speaker 255 according to an embodiment may output the electrical signal as sound (e.g., voice). The display 260 according to an embodiment may be configured to display an image or a video. The display 260 according to an embodiment may display the graphic user interface (GUI) of the running app (or an application program).

The memory 230 according to an embodiment may store a client module 231, a software development kit (SDK) 233, and a plurality of apps 335. The client module 231 and the SDK 233 may constitute a framework (or a solution program) for performing general-purposed functions. Furthermore, the client module 231 or the SDK 233 may constitute the framework for processing a voice input.

The plurality of apps 235 may be programs for performing a specified function. According to an embodiment, the plurality of apps 235 may include a first app 235a and/or a second app 235_3. According to an embodiment, each of the plurality of apps 235 may include a plurality of actions for performing a specified function. For example, the apps may include an alarm app, a message app, and/or a schedule app. According to an embodiment, the plurality of apps 235 may be executed by the processor 220 to sequentially execute at least part of the plurality of actions.

According to an embodiment, the processor 220 may control overall operations of the user terminal 201. For example, the processor 220 may be electrically connected to the communication interface 290, the microphone 270, the speaker 255, and the display 260 to perform a specified operation. For example, the processor 220 may include at least one processor.

Moreover, the processor 220 according to an embodiment may execute the program stored in the memory 230 so as to perform a specified function. For example, according to an embodiment, the processor 220 may execute at least one of the client module 231 or the SDK 233 so as to perform a following operation for processing a voice input. The processor 220 may control operations of the plurality of apps 235 via the SDK 233. The following actions described as the actions of the client module 231 or the SDK 233 may be the actions performed by the execution of the processor 220.

According to an embodiment, the client module 231 may receive a voice input. For example, the client module 231 may receive a voice signal corresponding to a user utterance detected through the microphone 270. The client module 231 may transmit the received voice input (e.g., a voice input) to the intelligence server 300. The client module 231 may transmit state information of the user terminal 201 to the intelligence server 300 together with the received voice input. For example, the state information may be execution state information of an app.

According to an embodiment, the client module 231 may receive a result corresponding to the received voice input. For example, when the intelligence server 300 is capable of calculating the result corresponding to the received voice input, the client module 231 may receive the result corresponding to the received voice input. The client module 231 may display the received result on the display 260.

According to an embodiment, the client module 231 may receive a plan corresponding to the received voice input. The client module 231 may display, on the display 260, a result of executing a plurality of actions of an app depending on the plan. For example, the client module 231 may sequentially display the result of executing the plurality of actions on a display. For another example, the user terminal 201 may display only a part of results (e.g., a result of the last action) of executing the plurality of actions, on the display.

According to an embodiment, the client module 231 may receive a request for obtaining information necessary to calculate the result corresponding to a voice input, from the intelligence server 300. According to an embodiment, the client module 231 may transmit the necessary information to the intelligence server 300 in response to the request.

According to an embodiment, the client module 231 may transmit, to the intelligence server 300, information about the result of executing a plurality of actions depending on the plan. The intelligence server 300 may identify that the received voice input is correctly processed, using the result information.

According to an embodiment, the client module 231 may include a speech recognition module. According to an embodiment, the client module 231 may recognize a voice input for performing a limited function, via the speech recognition module. For example, the client module 231 may launch an intelligence app for processing a specific voice input by performing an organic action, in response to a specified voice input (e.g., wake up!).

According to an embodiment, the intelligence server 300 may receive information associated with a user's voice input from the user terminal 201 over a communication network 299. According to an embodiment, the intelligence server 300 may convert data associated with the received voice input to text data. According to an embodiment, the intelligence server 300 may generate at least one plan for performing a task corresponding to the user's voice input, based on the text data.

According to an embodiment, the plan may be generated by an artificial intelligent (AI) system. The AI system may be a rule-based system, or may be a neural network-based system (e.g., a feedforward neural network (FNN) and/or a recurrent neural network (RNN)). Alternatively, the AI system may be a combination of the above-described systems or an AI system different from the above-described system. According to an embodiment, the plan may be selected from a set of predefined plans or may be generated in real time in response to a user's request. For example, the AI system may select at least one plan of the plurality of predefined plans.

According to an embodiment, the intelligence server 300 may transmit a result according to the generated plan to the user terminal 201 or may transmit the generated plan to the user terminal 201. According to an embodiment, the user terminal 201 may display the result according to the plan, on a display. According to an embodiment, the user terminal 201 may display a result of executing the action according to the plan, on the display.

The intelligence server 300 according to an embodiment may include a front end 310, a natural language platform 320, a capsule database 330, an execution engine 340, an end user interface 350, a management platform 360, a big data platform 370, or an analytic platform 380.

According to an embodiment, the front end 310 may receive a voice input received from the user terminal 201. The front end 310 may transmit a response corresponding to the voice input to the user terminal 201.

According to an embodiment, the natural language platform 320 may include an automatic speech recognition (ASR) module 321, a natural language understanding (NLU) module 323, a planner module 325, a natural language generator (NLG) module 327, and/or a text to speech module (TTS) module 329.

According to an embodiment, the ASR module 321 may convert the voice input received from the user terminal 201 into text data. According to an embodiment, the NLU module 323 may grasp the intent of the user, using the text data of the voice input. For example, the NLU module 323 may grasp the intent of the user by performing syntactic analysis or semantic analysis. According to an embodiment, the NLU module 323 may grasp the meaning of words extracted from the voice input by using linguistic features (e.g., syntactic elements) such as morphemes or phrases and may determine the intent of the user by matching the grasped meaning of the words to the intent.

According to an embodiment, the planner module 325 may generate the plan by using a parameter and the intent that is determined by the NLU module 323. According to an embodiment, the planner module 325 may determine a plurality of domains necessary to perform a task, based on the determined intent. The planner module 325 may determine a plurality of actions included in each of the plurality of domains determined based on the intent. According to an embodiment, the planner module 325 may determine the parameter necessary to perform the determined plurality of actions or a result value output by the execution of the plurality of actions. The parameter and the result value may be defined as a concept of a specified form (or class). As such, the plan may include the plurality of actions and/or a plurality of concepts, which are determined by the intent of the user. The planner module 325 may determine the relationship between the plurality of actions and the plurality of concepts stepwise (or hierarchically). For example, the planner module 325 may determine the execution sequence of the plurality of actions, which are determined based on the user's intent, based on the plurality of concepts. In other words, the planner module 325 may determine an execution sequence of the plurality of actions, based on the parameters necessary to perform the plurality of actions and the result output by the execution of the plurality of actions. Accordingly, the planner module 325 may generate a plan including information (e.g., ontology) about the relationship between the plurality of actions and the plurality of concepts. The planner module 325 may generate the plan, using information stored in the capsule DB 330 storing a set of relationships between concepts and actions.

According to an embodiment, the NLG module 327 may change specified information into information in a text form. The information changed to the text form may be in the form of a natural language speech. The TTS module 329 according to an embodiment may change information in the text form to information in a voice form.

According to an embodiment, all or part of the functions of the natural language platform 320 may be also implemented in the user terminal 201.

The capsule DB 330 may store information about the relationship between the actions and the plurality of concepts corresponding to a plurality of domains. According to an embodiment, the capsule may include a plurality of action objects (or action information) and concept objects (or concept information) included in the plan. According to an embodiment, the capsule DB 330 may store the plurality of capsules in a form of a concept action network (CAN). According to an embodiment, the plurality of capsules may be stored in the function registry included in the capsule DB 330.

The capsule DB 330 may include a strategy registry that stores strategy information necessary to determine a plan corresponding to a voice input. When there are a plurality of plans corresponding to the voice input, the strategy information may include reference information for determining one plan. According to an embodiment, the capsule DB 330 may include a follow-up registry that stores information of the follow-up action for suggesting a follow-up action to the user in a specified context. For example, the follow-up action may include a follow-up utterance. According to an embodiment, the capsule DB 330 may include a layout registry storing layout information of information output via the user terminal 201. According to an embodiment, the capsule DB 330 may include a vocabulary registry storing vocabulary information included in capsule information. According to an embodiment, the capsule DB 330 may include a dialog registry storing information about dialog (or interaction) with the user. The capsule DB 330 may update an object stored via a developer tool. For example, the developer tool may include a function editor for updating an action object or a concept object. The developer tool may include a vocabulary editor for updating a vocabulary. The developer tool may include a strategy editor that generates and registers a strategy for determining the plan. The developer tool may include a dialog editor that creates a dialog with the user. The developer tool may include a follow-up editor capable of activating a follow-up target and editing the follow-up utterance for providing a hint. The follow-up target may be determined based on a target, the user's preference, or an environment condition, which is currently set. The capsule DB 330 according to an embodiment may be also implemented in the user terminal 201.

According to an embodiment, the execution engine 340 may calculate a result by using the generated plan. The end user interface 350 may transmit the calculated result to the user terminal 201. Accordingly, the user terminal 201 may receive the result and may provide the user with the received result. According to an embodiment, the management platform 360 may manage information used by the intelligence server 300. According to an embodiment, the big data platform 370 may collect data of the user. According to an embodiment, the analytic platform 380 may manage quality of service (QoS) of the intelligence server 300. For example, the analytic platform 380 may manage the component and processing speed (or efficiency) of the intelligence server 300.

According to an embodiment, the service server 400 may provide the user terminal 201 with a specified service (e.g., ordering food or booking a hotel). According to an embodiment, the service server 400 may be a server operated by the third party. According to an embodiment, the service server 400 may provide the intelligence server 300 with information for generating a plan corresponding to the received voice input. The provided information may be stored in the capsule DB 330. Furthermore, the service server 400 may provide the intelligence server 300 with result information according to the plan.

In the above-described integrated intelligence system, the user terminal 201 may provide the user with various intelligent services in response to a user input. The user input may include, for example, an input through a physical button, a touch input, or a voice input.

According to an embodiment, the user terminal 201 may provide a speech recognition service via an intelligence app (or a speech recognition app) stored therein. In this case, for example, the user terminal 201 may recognize a user utterance or a voice input, which is received via the microphone, and may provide the user with a service corresponding to the recognized voice input.

According to an embodiment, the user terminal 201 may perform a specified action, based on the received voice input, independently, or together with the intelligence server 300 and/or the service server 400. For example, the user terminal 201 may launch an app corresponding to the received voice input and may perform the specified action via the executed app.

According to an embodiment, when providing a service together with the intelligence server 300 and/or the service server 400, the user terminal 201 may detect a user utterance by using the microphone 270 and may generate a signal (or voice data) corresponding to the detected user utterance. The user terminal may transmit the voice data to the intelligence server 300 by using the communication interface 290.

According to an embodiment, the intelligence server 300 may generate a plan for performing a task corresponding to the voice input or the result of performing an action depending on the plan, as a response to the voice input received from the user terminal 201. For example, the plan may include a plurality of actions for performing the task corresponding to the voice input of the user and/or a plurality of concepts associated with the plurality of actions. The concept may define a parameter to be input upon executing the plurality of actions or a result value output by the execution of the plurality of actions. The plan may include relationship information between the plurality of actions and/or the plurality of concepts.

According to an embodiment, the user terminal 201 may receive the response by using the communication interface 290. The user terminal 201 may output the voice signal generated in the user terminal 201 to the outside by using the speaker 255 or may output an image generated in the user terminal 201 to the outside by using the display 260.

In FIG. 2, it is described that speech recognition of a voice input received from the user terminal 201, understanding and generating a natural language, and calculating a result by using a plan are performed on the intelligence server 300. However, certain embodiments of the disclosure are not limited thereto. For example, at least part of configurations (e.g., the natural language platform 320, the execution engine 340, and the capsule DB 330) of the intelligence server 300 may be embedded in the user terminal 201 (or the electronic device 101 of FIG. 1), and the operation thereof may be performed by the user terminal 201.

Figure 3:
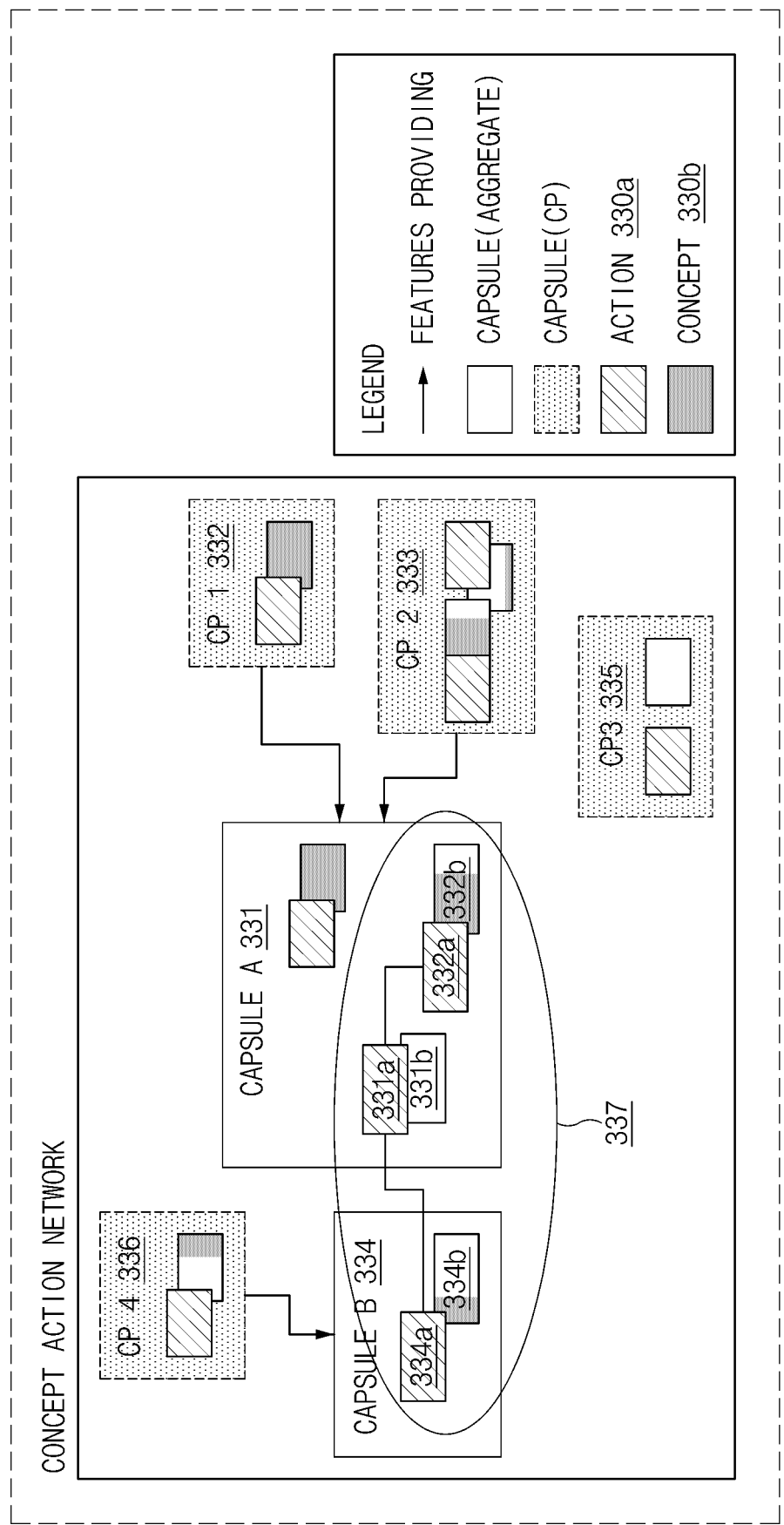
FIG. 3 is a diagram illustrating the form in which relationship information between a concept and an action is stored in a database, according to an embodiment.

FIG. 3 is a diagram illustrating a form in which relationship information between a concept and an action is stored in a database, according to certain embodiments.

A capsule database (e.g., the capsule DB 330) of the intelligence server 200 may store a capsule in the form of a CAN. The capsule DB may store an action for processing a task corresponding to a user's voice input and a parameter necessary for the action, in the CAN form.

The capsule DB may store a plurality capsules (a capsule A 331 and a capsule B 334) respectively corresponding to a plurality of domains (e.g., applications). According to an embodiment, a single capsule (e.g., the capsule A 331) may correspond to a single domain (e.g., a location (geo) or an application). Furthermore, at least one service provider (e.g., CP 1 332 or CP 2 333) for performing a function for a domain associated with the capsule may correspond to one capsule. According to an embodiment, the single capsule may include at least one or more actions 330a and at least one or more concepts 330b for performing a specified function.

The natural language platform 220 may generate a plan for performing a task corresponding to the received voice input, using the capsule stored in a capsule database. For example, the planner module 225 of the natural language platform may generate the plan by using the capsule stored in the capsule database. For example, a plan 337 may be generated by using actions 331a and 332a and concepts 331b and 332b of the capsule A 330a and an action 334a and a concept 334b of the capsule B 334.

Figure 4:
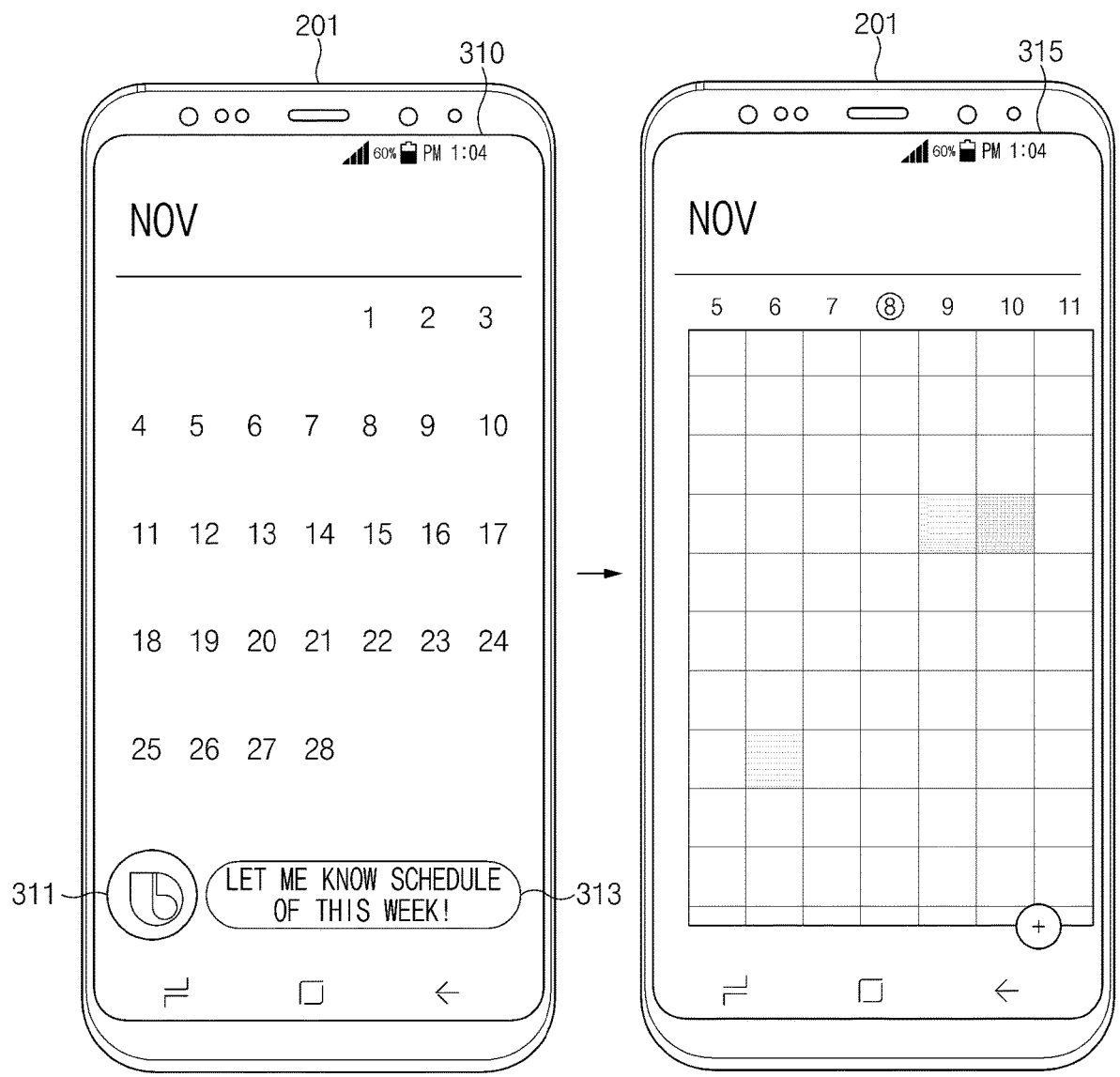
FIG. 4 is a view illustrating a user terminal displaying a screen of processing a voice input received through an intelligence app, according to an embodiment.

FIG. 4 is a view illustrating a screen in which a user terminal processes a voice input received through an intelligence app, according to certain embodiments.

The user terminal 201 may execute an intelligence app to process a user input through the intelligence server 200.

According to an embodiment, on screen 210, when recognizing a specified voice input (e.g., wake up!) or receiving an input via a hardware key (e.g., a dedicated hardware key), the user terminal 201 may launch an intelligence app for processing a voice input. For example, the user terminal 201 may launch the intelligence app in a state where a schedule app is executed. According to an embodiment, the user terminal 201 may display an object (e.g., an icon) 211 corresponding to the intelligence app, on the display 340. According to an embodiment, the user terminal 201 may receive a voice input by a user utterance. For example, the user terminal 201 may receive a voice input saying that "let me know the schedule of this week!". According to an embodiment, the user terminal 201 may display a user interface (UI) 213 (e.g., an input window) of the intelligence app, in which text data of the received voice input is displayed, on a display.

According to an embodiment, on screen 215, the user terminal 201 may display a result corresponding to the received voice input, on the display. For example, the user terminal 201 may receive a plan corresponding to the received user input and may display 'the schedule of this week' on the display depending on the plan.

Figure 5:
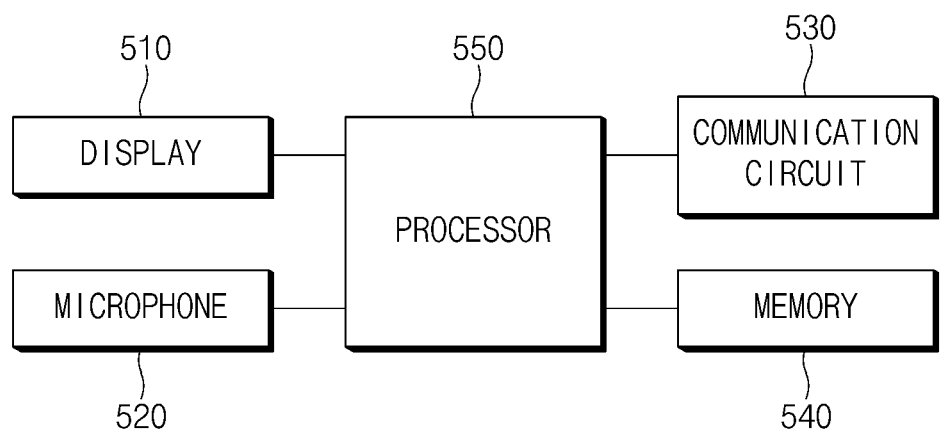
FIG. 5 is a block diagram of an electronic device, according to an embodiment.

FIG. 5 is a block diagram of an electronic device, according to an embodiment. The electronic device includes a microphone 520 configured to receive a user command. Upon receipt of the user command, a communication circuit 530 can transmit the user command to an external electronic device. The external electronic device may determine a recommended voice command and transmit the recommended voice command to the communication circuit 530 of the electronic device 500. The display 510 displays the recommended voice command to the user. The recommended voice command can be a voice command that most likely captures the intent of the user when making the original user command.

According to an embodiment, an electronic device 500 (e.g., the electronic device 101 of FIG. 1 or the user terminal 201 of FIGS. 2 to 4) may include a display 510 (e.g., the display module 160 of FIG. 1 or the display 260 of FIG. 2), a microphone 520 (e.g., the input module 150 of FIG. 1 or the microphone 270 of FIG. 2), a communication circuit 530 (e.g., the communication module 190 of FIG. 1 or the communication interface 290 of FIG. 2), a memory 540 (e.g., the memory 130 of FIG. 1 or the memory 230 of FIG. 2), and/or a processor 550 (e.g., the processor 120 of FIG. 1 or the processor 220 of FIG. 2).

The display 510 may visually provide data to a user. For example, the display 510 may visually provide a message to the user. For example, the display 510 may display a result (e.g., a response message) of an operation corresponding to the user's voice input. For example, the display 510 may display a user interface corresponding to the user's voice input. The display 510 may display a recommended voice command through the user interface.

The microphone 520 may receive an external sound input. For example, the microphone 520 may receive the user's voice input.

The communication circuit 530 may communicate with the external electronic device 500 (e.g., the electronic device 102 or 104 of FIG. 1 or the intelligence server 300 of FIGS. 2 to 4). For example, the communication circuit 530 may transmit and receive data to and from the external electronic device 500. For example, the communication circuit 530 may receive information, which is associated with at least one external execution device capable of performing an operation corresponding to a voice command, from at least one external execution device. For example, the external execution device may be an external device, which is capable of performing or performs an operation corresponding to an actual voice command. The external device may be a device registered in a user account and/or a device that communicates with the electronic device 500. The communication circuit 530 may receive information related to an external electronic device from the external electronic device (e.g., an external IoT server).

When the electronic device 500 provides a recommended voice command in conjunction with the external electronic device 500 (e.g., the electronic device 102 or 104 of FIG. 1, the server 108 of FIG. 1, or the intelligence server 300 of FIGS. 2 to 4), the communication circuit 530 may transmit information about the user's voice input (e.g., a voice command), information about a message being provided, and/or information related to the state of the electronic device 500 to the external electronic device. The electronic device 500 may receive information about a command for performing a specified operation and/or a recommended voice command from the external electronic device 500.

According to an embodiment, for example, the external electronic device may be configured to receive control data from the electronic device 500 and to perform an operation according to the control data, by using a short-range network (e.g., NFC, WiFi, LAN, Bluetooth, or D2D) or an RF signal.

The memory 540 may store instructions that, when executed by the processor 550, cause the processor 530 to control an operation of the electronic device 500. The memory 540 may at least temporarily store data used to perform an operation of the electronic device 500. For example, the memory 540 may include a database on an external execution device that is registered in a user account and connected to or connectable to the electronic device 500. For example, the external execution device may mean a device capable of actually performing an operation corresponding to a voice command. For example, the database on the external execution device may store information (e.g., an identifier, capability information, and/or type information of the external execution device) related to the external execution device. The database on the external execution device may be stored in an external server (e.g., an external IoT server). For example, the memory 540 may store information about a message, information about a recommended voice command, and/or information about a predefined voice command matching a sentence (e.g., a split sentence pattern) included in the message.

The processor 550 may split characters from the message being provided to the user. The characters may be split in units of action that are capable of being performed as one or a single operation. The message may include at least one of a screen (a graphic that consumes all, if not substantially, the display) displayed on the display 510 of the electronic device 500, a voice output by the electronic device 500, and a response to a user's voice input. For example, the message may include various types of information for provision to the user by the electronic device 500, a response to a user input, and/or a feedback.

The processor 550 may split at least some sentences of the message into action-unit sentences through part of speech (POS) tagging or dependency parsing. For example, the dependency parsing may be a method of finding the relationship for each word by identifying the grammatical structure of a sentence.

The processor 550 may convert each of the split action-unit sentences into a form of a voice command. For example, the processor 550 may convert the ending of each split sentence into an expression corresponding to a command. By analyzing the meaning of the sentence, the processor 550 may recognize sentences incapable of being converted into a form of a voice command. The processor 550 may exclude sentences incapable of being converted in a form of a voice command from a processing target for providing a recommended voice command.

The processor 550 may determine whether there is a predefined voice command matching the split sentence. When the predefined voice command matching the split sentence is present, the processor 550 may convert the corresponding sentence into the predefined voice command.

The processor 550 may determine whether an operation corresponding to the converted voice command is capable of being performed. The determination may be based on at least one of user information, information related to the electronic device 500 (e.g., a user terminal), information related to the external electronic device (e.g., a voice assistant server) connected to the electronic device 500, and information related to an external execution device connected to the electronic device 500 and/or the external electronic device. For example, the processor 550 may perform natural language (NL) processing on the converted voice command, and may perform input evaluation on the NL-processed voice command. Alternatively, the processor 550 may recognize a domain, intent, and/or slot for performing an operation corresponding to a voice command by performing NL processing on the converted voice command. On the basis of the result of performing input evaluation that is based on the recognized domain, intent, and/or slot, the processor 550 may determine whether an operation corresponding to the voice command is capable of being performed. For example, through the input evaluation, the processor 550 may determine whether a user has a device for performing an operation corresponding to the voice command, based on user information (e.g., user account information). Alternatively, through the input evaluation, the processor 550 may determine whether the electronic device 500 or the external electronic device 500 connected to the electronic device 500 has the ability to perform an operation corresponding to the voice command, or may determine whether the electronic device 500 or the external electronic device 500 connected to the electronic device 500 is in a state in which the user is capable of performing an operation corresponding to a voice command.

The processor 550 may provide information of at least one voice command corresponding to an operation, which is capable of being performed based on the determination. The information may be provided as information of a recommended voice command. For example, the processor 550 may provide a user interface including a recommended voice command. The recommended voice command may correspond to an operation capable of being actually performed.

The electronic device 500 may recommend a proper voice command available for various domains regardless of a domain being currently operated (served), by recognizing a voice command, which is capable of actually performing an operation, based on content included in a message being provided by the electronic device 500 and providing the voice command as the recommended voice command.

Figure 6:
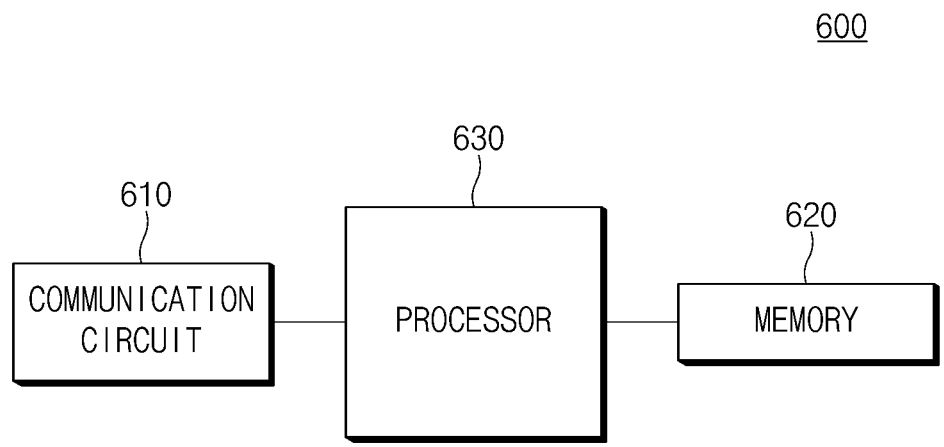
FIG. 6 is a block diagram of an electronic device, according to an embodiment.

FIG. 6 is a block diagram of an electronic device, according to an embodiment.

An electronic device 600 (e.g., the electronic device 102 or 104 of FIG. 1, the server 108 of FIG. 1, or the intelligence server 300 of FIGS. 2 to 4) may include a communication circuit 610, a memory 620, and a processor 630.

The communication circuit 610 may communicate with an external electronic device (e.g., the electronic device 101 of FIG. 1 or the user terminal 201 of FIGS. 2 to 4). For example, the processor 630 may transmit and receive data to and from the external electronic device through the communication circuit 610. The processor 630 may receive information about a user's voice input (e.g., a voice command) and/or information about the state of the external electronic device from the external electronic device (e.g., a user terminal) through the communication circuit 610 or may transmit a command that allows the external electronic device to perform a specified operation. The communication circuit 610 may receive information, which is related to at least one external execution device capable of performing an operation corresponding to a voice command, from the external electronic device. The external execution device may be a device, which communicates with an external electronic device (e.g., a user terminal) or is registered in a user account, and may include a device capable of performing an operation corresponding to a voice command. The communication circuit 610 may receive information related to the external execution device from an external server (e.g., an external IoT server) that stores information (e.g., a database on an external execution device) related to the external execution device, or may receive information related to the external execution device from the external electronic device (e.g., a user terminal). For example, the processor 630 may receive information about a message, which is being provided by the external electronic device, from an external electronic device (e.g., a user terminal) through the communication circuit 610. For example, the processor 630 may provide information about a recommended voice command to an external electronic device (e.g., a user terminal) through the communication circuit 610. For example, together with the information about the recommended voice command, the processor 630 may transmit a command, which allows the external electronic device to provide the recommended voice command to a user, through the communication circuit 610

The memory 620 may store instructions that, when executed by the processor 630, cause the processor 630 to control an operation of the electronic device 600. The memory 620 may at least temporarily store data used to perform an operation of the electronic device 600. For example, the memory 620 may include a database on an external execution device that is registered in a user account and connected to or connectable to the electronic device 600. For example, the external execution device may be an external device capable of actually performing an operation corresponding to a voice command. For example, the database on the external execution device may store information (e.g., an identifier, capability information, and/or type information of an external execution device) about the external execution device. The database on the external execution device may be stored in an external server (e.g., an external IoT server). For example, the memory 620 may store information about a message received from an external electronic device, information about a recommended voice command, and/or information about a predefined voice command matching a sentence (e.g., a split sentence pattern) included in the message.

The processor 630 may receive information about the message being provided by the external electronic device, from the external electronic device through the communication circuit 610. For example, the message may include various types of information being provided to the user by the external electronic device, a response to a user input, and/or a feedback.

The processor 630 may split a sentence included in the message in units of action based on the information about the message. The electronic device 600 may split at least some sentences included in the message into action-unit sentences through POS tagging or dependency parsing.

The processor 630 may convert each of the split action-unit sentences in a form of a voice command. For example, the processor 630 may convert the ending of each sentence split in units of action into an expression corresponding to a command. The processor 630 may determine whether there is a predefined voice command matching the sentence split in units of action. When the predefined voice command matching the sentence split in units of action is present, the processor 630 may convert the corresponding sentence into the predefined voice command.

The processor 630 may determine whether an operation corresponding to the converted voice command is capable of being performed, based on at least one of user information, information related to the electronic device 600, and information related to an external execution device (e.g., an external device capable of performing an operation corresponding to a voice command) connected to the electronic device 600 and/or the external electronic device 500. For example, the processor 630 may perform NL processing on the converted voice command, and may perform input evaluation on the NL-processed voice command. For example, the processor 630 may recognize a domain, intent, and/or slot for performing an operation corresponding to a voice command by performing NL processing on the converted voice command. On the basis of the result of performing input evaluation that is based on the recognized domain, intent, and/or slot, the processor 630 may determine whether an operation corresponding to the voice command is capable of being performed.

The processor 630 may perform an NL processing operation and/or an input evaluation operation through a second external electronic device (e.g., an integrated intelligence server (e.g., a voice assistant server), or an integrated intelligence system (e.g., a voice assistant system)). For example, the processor 630 may provide information related to the converted voice command to the second external electronic device through the communication circuit 610 and may receive information about the result of performing NL processing and/or input evaluation on the voice command from the second external electronic device through the communication circuit 610.

The processor 630 may determine information of at least one recommended voice command corresponding to an operation capable of being performed based on the determination. For example, the processor 630 may determine that at least one voice command capable of performing an operation corresponding to an actual voice command among the converted voice commands is a recommended voice command, based on the result of the NL processing and the input evaluation.

The processor 630 may provide information about at least one recommended voice command to an external electronic device. For example, the processor 630 may provide the user with a recommended voice command corresponding to an operation capable of being actually performed through the external electronic device.

The electronic device 600 may recommend a proper voice command available for various domains regardless of a domain being currently operated (served), by recognizing a voice command, which is capable of actually performing an operation, based on content included in a message being provided by the external electronic device and providing the voice command as the recommended voice command.

Figure 7:
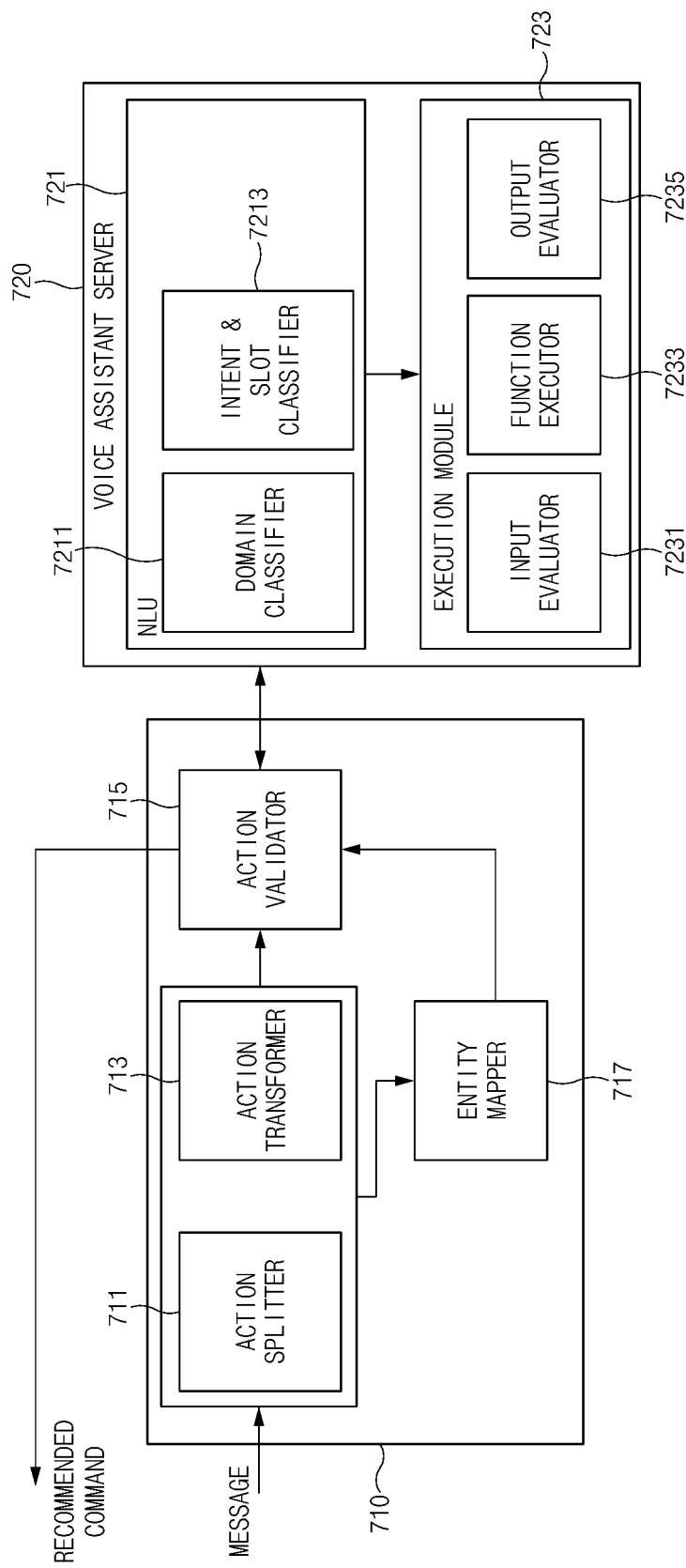
FIG. 7 is a diagram schematically illustrating an integrated intelligence system, according to an embodiment.

FIG. 7 is a diagram schematically illustrating an integrated intelligence system, according to an embodiment. The integrated intelligence system can receive a message. Action splitter module 711 may split a sentence in a message into units of action, action-unit sentences. The units of action may each be capable of being performed by a single command. The action transformer module 713 may transform the action-unit sentences from the action splitter module 711, into a form of a voice command. The action validator 715 can determine whether the voice command is capable of being performed. The action validator 715 may use a voice assistant server 720, equipped with an NLU 721 and an execution module 723.

An integrated intelligence system may include a recommended voice command providing module 710 (e.g., the electronic device 500 of FIG. 5 or the electronic device 600 of FIG. 6) and a voice assistant server 720 (e.g., a Bixby operating service (BOS) server) (e.g., the intelligence server 300 of FIG. 2).

The recommended voice command providing module 710 may include an action splitter module 711, an action transformer module 713, an action validator module 715, and an entity mapper module 717.

The action splitter module 711 may receive a message (or information related to the message), which is being provided by an external electronic device, from the external electronic device (e.g., a mobile terminal) (e.g., the electronic device 101 of FIG. 1 or the user terminal 201 of FIG. 2). The message may include at least one of a screen displayed on a display of an electronic device, a voice (e.g., a voice obtained by converting a text through text-to-speech (TTS)) output by the electronic device, and a response to a user's voice input. For example, the message may include various types of information being provided to the user by the electronic device, a response to a user input, and/or a feedback. For example, the message may include a paragraph composed of one or more sentences.

The action splitter module 711 may split a sentence included in the message in units of action capable of being performed as one operation. The action splitter module 711 may split at least some sentences included in the message into action-unit sentences through POS tagging or dependency parsing. For example, the action splitter module 711 may split a sentence of "pour 550 ml of water and put soup powder and ingredients, please" into "pour 550 ml of water and" and "put soup powder and ingredients, please.".

The action splitter module 711 may split a sentence extracted from a partial region of the message in units of action. For example, when the message is a file (e.g., a file (RecipeDirectionSection.layout) defining a UI configuration that shows an operation description according to a cooking order or a file (Dustinfo.layout) defining a UI configuration that shows dust information) that defines a configuration of a user interface (UI), a region from which a sentence is to be extracted may be specified by using a code (e.g., useRecommnedCommands) that specifies the partial region of the corresponding file. For example, the partial region of the message (e.g., UI) may be preset by a developer of an application that provides the message. For example, the action splitter module 711 may selectively split only the sentence included in the partial region of a preset message into an action-unit sentence.

The action transformer module 713 may transform the action-unit sentence from the action splitter module 711, into a form of a voice command. For example, the action transformer module 713 may transform a sentence of "pour 550 ml of water and" into "pour 550 ml of water, please.". According to an embodiment, when the action transformer module 713 is an incomplete word, an incomplete sentence, or a complete sentence, the action transformer module 713 may transform the action unit sentence into a voice command form by using a model (e.g., an artificial intelligence learning model) capable of being supported by the voice assistant server 720 and outputting an utterance predicted to perform a corresponding role (or operation). For example, when entering the sentence of "pour 550 ml of water and", the action transformer module 713 may train a model so as to output a voice command such as "purify 550 ml of water with a water purifier, please." and may transform a sentence into a form of a voice command by using the corresponding model.

The action validator module 715 may determine whether an operation corresponding to the voice command or the entity mapper module 717 is capable of being actually performed. For example, the action validator module 715 may determine whether there is an appropriate intent for performing a voice command, may determine whether a user has a necessary device, or may determine whether an application for performing a voice command is installed in a device owned by the user. For example, to perform an operation corresponding to a voice command such as "pour 550 ml of water, please.", the user needs to own a water purifier capable of being controlled with a voice command, and it is necessary that the water purifier is currently in a state capable of purifying water.

The action validator module 715 may determine whether an operation corresponding to a voice command is capable of being actually performed, by using the voice assistant server 720. For example, the action validator module 715 may classify the domain, intent, and/or slot of the voice command and may request the voice assistant server 720 to perform input evaluation. For example, the action validator module 715 may receive information (e.g., a result of performing NL processing and input evaluation on a voice command) about whether an operation corresponding to the voice command is capable of being actually performed, from the voice assistant server 720.

The entity mapper module 717 may convert a sentence obtained from the action splitter module 711 or the action transformer module 713 in a form of a voice command through pattern matching. For example, the entity mapper module 717 may convert a sentence split in units of action or a sentence converted in a form of a voice command into the mapped voice command. The entity mapper module 717 may operate before an operation of the action transformer module 713 is performed or when the action transformer module 713 fails to convert a sentence in a form of a voice command. The entity mapper module 717 may provide the converted voice command to the action validator module 715.

A pattern of the sentence may be determined depending on words included in the sentence and/or the semantic analysis of the sentence. For example, the predefined pattern may include a pattern (e.g., a sentence composed of words (e.g., seconds, minutes, hours) related to numbers and time) related to duration, or a pattern (e.g., a sentences related to dust concentration) related to dust, but is not limited thereto. According to an embodiment, when the sentence belongs to a predefined pattern, the electronic device may recognize a predefined voice command corresponding to the predefined pattern. For example, the entity mapper module 717 may convert a time-related sentence (e.g., a sentence pattern including the time-related meaning) into a predefined voice command related to a timer operation. For example, when a sentence includes a time-related expression (e.g., ○ seconds, ○ minutes, or ○ hours), the entity mapper module 717 may determine that the corresponding sentence matches a predefined pattern (e.g., a duration pattern) and may convert the corresponding sentence into a voice command (e.g., "start a timer ○ seconds, ○ minutes, or ○ hours") corresponding to the predefined pattern. For example, the entity mapper module 717 may convert a sentence indicating a current state, not an operation to be performed, such as "the state of fine dust is bad", into a voice command mapped to a pattern. For example, an electronic device may recognize a pattern related to predefined dust from the sentence "the state of fine dust is bad" and may recognize the predefined voice command of "turn on an air purifier" corresponding to the dust-related pattern. For example, the electronic device may recognize (obtain) the voice command of "turn on the air purifier" from the sentence of "the state of fine dust is bad".

The recommended voice command providing module 710 (e.g., the action validator module 715) may deliver the converted voice command or information related to the voice command to the voice assistant server 720. The recommended voice command providing module 710 may receive information indicating whether an operation corresponding to a voice command delivered to the voice assistant server 720 is capable of being performed, from the voice assistant server 720.

The voice assistant server 720 may include a natural language understanding (NLU) module 721 and an execution module 723.

The NLU module 721 (e.g., the NLU module 323) may perform NL processing on an utterance (e.g., a voice command) obtained from a user and may grasp the intent and/or domain for a user input. The NLU module 721 may include a domain classifier 7211 and an intent & slot classifier 7213.

The domain classifier 7211 may determine a domain (e.g., application) corresponding to a user input (e.g., a voice command).

The intent & slot classifier 7213 may determine a user intent corresponding to the user input (e.g., a voice command). The intent & slot classifier 7213 may determine a parameter (or slot) required when an operation according to the user intent is performed. For example, the intent & slot classifier 7213 may extract a parameter (or slot), which is required when an operation according to the user intent is performed, from the user input.

FIG. 7 illustrates that the NLU module 721 includes the domain classifier 7211 and the intent & slot classifier 7213, but is not limited thereto. The NLU module 721 may have various shapes and configurations. For example, the NLU module 721 may classify domains, intents, and slots at once in response to a user input (e.g., a voice command) by using a single module in which the domain classifier 7211 and the intent & slot classifier 7213 are integrated with each other. As another example, the NLU module 721 may be implemented to deliver the user input (e.g., a voice command) to an intent and/or slot classifier (not shown) operating for each domain without the domain classifier 7211, and to obtain intent, a slot, and a confidence result (or a confidence score). For example, the NLU module 721 may identify a domain, which has the confidence of a high priority, from among domains for which the intent is not rejected. When the confidence is not less than a specified threshold, the NLU module 721 may deliver the intent delivered by the corresponding domain to the execution module 723 (e.g., the input evaluator module 7231). According to an embodiment, in addition to the confidence level (or result), the NLU module 721 may select a domain corresponding to a voice command based on a user preference, the user's usage history, and/or a category of a set domain. For example, the NLU module 721 may assign a weight to domains frequently employed by a user, or may select a domain corresponding to a voice command for each category of domain such that the proposed domain is not limited to a specified domain.

The intent & slot classifier 7213 may be implemented as a configuration in which an intent classifier and a slot classifier are separated from each other.

The execution module 723 (e.g., the execution engine 340) may include an input evaluator module 7231, a function executor module 7233, and an output evaluator module 7235.

To determine whether an operation corresponding to a voice command is capable of being performed, the input evaluator module 7231 may perform input evaluation. For example, the input evaluator module 7231 may determine whether a condition (e.g., whether a user has a device and/or whether the device is capable of supporting the operation) for performing the operation corresponding to the voice command is satisfied, based on information about a domain, intent, and/or slot received from the NLU module 721. For example, the input evaluator module 7231 may determine whether a user has a device for performing an operation corresponding to the voice command, based on user information (e.g., user account information). For example, the input evaluator module 7231 may determine whether a user has a water purifier in response to the voice command of "pour 550 ml of water, please." When a user has an available water purifier, the input evaluator module 7231 may determine that an input evaluation result is successful. When the user does not have an available water purifier, the input evaluator module 7231 may determine that the input evaluation result fails. For example, the input evaluator module 7231 may determine whether the device possessed by the user has the ability to perform an operation corresponding to the voice command, or may determine whether the operation corresponding to the voice command is capable of being performed.

In certain embodiments, the input evaluator module 7231 can extract nouns or the subject from the voice command, e.g., "water", review all of the external electronic devices that are available to the user, and then determine whether any one of external electronic devices is for performing an operation on the noun/subject.

According to an embodiment, when an operation corresponding to a voice command is capable of being performed, the input evaluator module 7231 may determine that the result of input evaluation is successful. The input evaluator module 7231 may deliver information about the result of input evaluation to the recommended voice command providing module 710 (e.g., the action validator module 715).

The function executor module 7233 may execute an operation corresponding to an actual voice command based on the domain, intent, and/or slot recognized by the NLU module 721.

The output evaluator module 7235 may evaluate the execution result of the operation corresponding to the voice command.

When the voice assistant server 720 performs a corresponding operation by processing a general voice command, all of the input evaluator module 7231, the function executor module 7233, and the output evaluator module 7235 may operate. However, when the voice assistant server 720 performs an operation of providing a recommended voice command, only the operation of the input evaluator module 7231 may be performed without performing operations of the function executor module 7233 and the output evaluator module 7235. For example, determining whether the operation corresponding to the voice command to provide a recommended voice command may cause only the operation of the input evaluator module 7231 to be performed. In this case, only the operation of the input evaluator module 7231 may be performed without performing operations of the function executor module 7233 and the output evaluator module 7235.

The voice assistant server 720 may receive a voice command or information related to the voice command from the recommended voice command providing module 710 and may determine whether an operation corresponding to the voice command is capable of being performed, through the NLU module 721 and the execution module 723 (e.g., the input evaluator module 7231). The voice assistant server 720 may provide the recommended voice command providing module 710 with a result of determining whether an operation corresponding to the voice command is capable of being performed.

The recommended voice command providing module 710 may be included in the voice assistant server 720, or the recommended voice command providing module 710 may be integrated with the voice assistant server 720. The recommended voice command providing module 710 may be included in an external electronic device (e.g., a mobile terminal). For example, the recommended voice command providing module 710 may be included in an external electronic device and may be implemented as an on-device module.

FIGS. 8A to 8F are diagrams for describing an operation of an electronic device (e.g., the electronic device 101, 102, or 104 of FIG. 1, the server 108 of FIG. 1, the user terminal 201 of FIG. 2, the intelligence server 300 of FIG. 2, the electronic device 500 of FIG. 5, the electronic device 600 of FIG. 6, the recommended voice command providing module 710 of FIG. 7, or the voice assistant server 720 of FIG. 7), according to an embodiment.

Figure 8F:
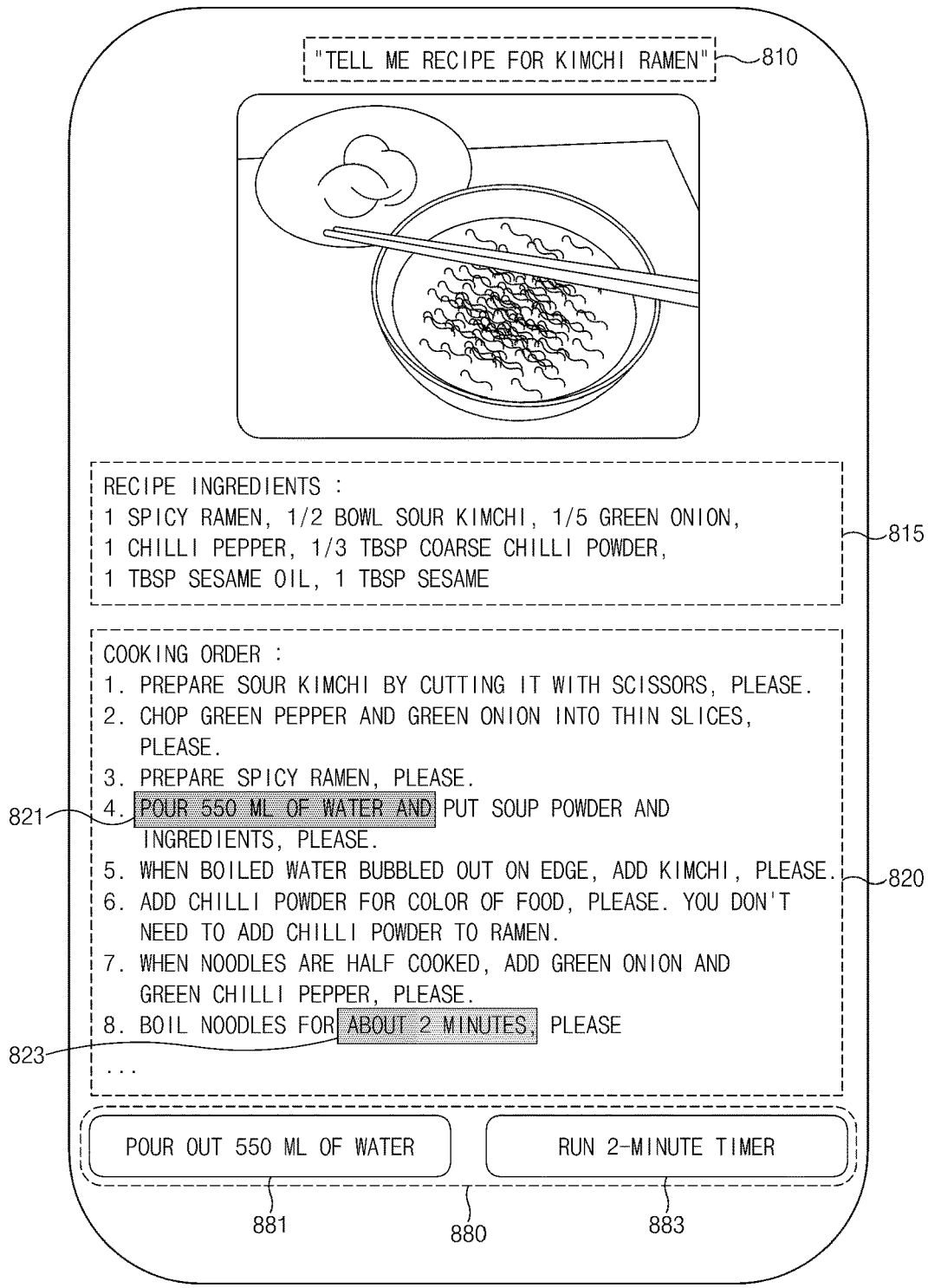

FIG. 8A shows an example of a message 801 provided by an electronic device. The message 801 may be similar to or identical to at least part of the user interface 800 in which a recommended voice command of FIG. 8F is provided. For example, the message 801 may include a screen provided in response to a user's voice input asking "tell me the recipe for Kimchi Ramen".

The message 801 may include information 810 of the user's voice input. For example, the message 801 include information, such as text, identifying recipe ingredients 815 and a cooking order 820.

An electronic device may recognize text information 810, 815, and/or 820 (e.g., sentences and/or paragraphs) included in the message 801. For example, the electronic device may recognize sentences included in the information 810 of the user's voice input, the information 815 of recipe ingredients, and the information 820 about the cooking order. The electronic device may recognize text information included in a partial region (e.g., the information 820 about the cooking order) selected from the message 801. For example, the information about the cooking order may include text information 821 to 829, 8210, and 8211 indicating the cooking order having the total of 11 stages. For example, a region (e.g., the region 820) selected in the message 801 may be selected by a user input, or may be preset for each message being provided, application being executed, and/or service being provided.

FIG. 8B shows an example 803 in which an electronic device splits text information 821 to 829, 8210, and 8211 included in the message 801 into action-unit sentences. According to an embodiment, an electronic device may split information (e.g., the information 820 about the cooking order) included in the message 801 (or at least part of the message 801) into action-unit sentences 831 to 839, and 8310 to 8316. For example, the action may correspond to one individual executable operation or behavior. The electronic device may split at least some sentences 821 to 829, 8210, and 8211 included in the message 801 into action-unit sentences 831 to 839 and 8310 to 8316 through POS tagging or dependency parsing.

For example, the electronic device may split the pieces of text information 821 to 829, 8210, and 8211 included in the information 820 about the cooking order into 16 action-unit sentences 831 to 839, and 8310 to 8316. For example, the electronic device may split the sentences 821 to 825 and 827 to 829 of some stages included in information about the cooking order into one action-unit sentence as it is, and may split the sentences 826, 8210, and 8211 of the other stages into a plurality of action-unit sentences. For example, the electronic device may split the paragraph 826 into the sentence 837 and the sentence 838. For example, the electronic device may split the sentence 8210 into the sentence 8312 and the sentence 8313. For example, the electronic device may split the sentence 8211 sentence into the sentence 8314, the sentence 8315, and the sentence 8316.

In certain embodiments, the electronic device can search for verb patterns and conjunctions to discern individual operations. For example, in the sentence, "Pour 550 ml of water and put soup powder and ingredients" 824, the electronic device can detect the user of the word "and" followed by the verb "put" and deduce that "put soup powder and ingredients" is a separate action unit 834. Additionally, in the sentence, "Put well-cooked ramen in bowl and add mashed sesame seeds" 8210, electronic device can detect the use of the word "and" followed by the verb "add" and deduce that "add meshed sesame seeds" is a separate action-unit 8313.

FIG. 8C shows an example 805 in which an electronic device converts the sentences 831 to 839 and 8310 to 8316 split in units of action into a form of a voice command. According to an embodiment, an electronic device may convert the sentences 831 to 839, and 8310 to 8316 split in units of action in a form of a voice command. For example, the electronic device may convert endings of the sentences 831 to 839 and 8310 to 8316 split in units of action into an expression corresponding to a command. The electronic device may recognize sentences (e.g., sentences 8514 to 8516) incapable of being converted in a form of a voice command by analyzing the meaning of the sentences. For example, the electronic device may exclude the sentences 8514 to 8516 incapable of being converted in a form of a voice command from a processing target (e.g., an NL processing target) for providing a recommended voice command. The electronic device may determine whether there is a predefined voice command matching the sentences 831 to 839, and 8310 to 8316 split in units of action. According to an embodiment, when the predefined voice command matching the sentence split in units of action is present, the electronic device may convert the corresponding sentence into the predefined voice command. For example, the electronic device may convert a time-related sentence (e.g., a sentence pattern including the time-related meaning) into a predefined voice command related to a timer operation. For example, when the sentence includes a time-related expression (e.g., ○ seconds, ○ minutes, and ○ hours), the electronic device may determine that the corresponding sentence matches the predefined pattern (e.g., a duration pattern) and may convert the corresponding sentence into a voice command (e.g., "start a timer ○ seconds, ○ minutes, or ○ hours") corresponding to the predefined pattern. For example, the electronic device may convert the time-related sentence 8310 of "boil noodles for about 2 minutes" into a predefined voice command of "start a 2-minute timer" 8510.

In certain embodiments, the electronic device can detect state of being verbs, such as "is", "are", "does" to determine sentences that are merely descriptive, but do not recite any operation, 8514-8516.

FIG. 8D shows an example 807 of a result of NL processing on voice commands 851 to 859 and 8510 to 8516 converted by an electronic device. According to an embodiment, an electronic device may perform NL processing on the sentences 851 to 859 and 8510 to 8516 converted into a form of a voice command. For example, the electronic device may determine whether there is a domain, intent, and/or slot capable of performing a corresponding operation (service) for each of the sentences 851 to 859 and 8510 to 8516 converted in the form of a voice command. For example, the electronic device may select sentences incapable of recognizing the domain, intent, and/or slot for performing an actual operation as a result of NL processing, and may exclude the selected sentences from a processing target for providing a recommended voice command. For example, the electronic device may recognize "DeviceControl/DispenceWaterPurifier" 874 (e.g., domain 'smartthings (or a domain for controlling an external electronic device)' or 'water purifier', intent 'water out', and parameter '550 ml') corresponding to the domain and/or intent for controlling a water purifier from the sentence 854 of "pour 550 ml of water". For example, the electronic device may recognize "Clock/StartTimer" 8710 (e.g., domain 'clock', intent 'start timer', and parameter '2 minutes') corresponding to the domain and/or intent for starting a timer from the sentence 8510 of "start a 2-minute timer". For example, the electronic device may exclude sentences 871 to 873, 875 to 879, and 8711 to 8716 other than sentences 854 and 8510 from a processing target (e.g., a target for performing input evaluation) for providing a recommended voice command.

FIG. 8E shows an example 809 of results 894 and 8910 indicating that an electronic device performs input evaluation on NL-processed voice commands 874 and 8710. For example, input evaluation may be an operation of determining whether an operation corresponding to a domain and/or intent 874 or 8710, which is recognized as a result of NL processing, is capable of being actually performed. For example, the electronic device may perform input evaluation based on at least one of user information, information related to an electronic device, and/or information related to an external electronic device. For example, the electronic device may determine whether a user owns a device capable of performing the domain and/or intent 874 or 8710, which is obtained as a result of NL processing, based on user information (e.g., user account information). For example, the electronic device may determine whether the user owns a water purifier in response to a voice command 894. The electronic device may determine whether the corresponding operation (e.g., an operation of pouring 550 ml of water through a water purifier) is capable of being performed, based on information related to the electronic device and/or information related to the external electronic device (e.g., a water purifier). For example, the electronic device may determine whether a corresponding operation (e.g., start a timer) is capable of being performed through an electronic device or an external electronic device, in response to the voice command 8910. The electronic device may determine that voice commands (e.g., 894 and 8910) capable of performing an actual operation are recommended voice commands as a result of input evaluation.

FIG. 8F shows an example of a user interface 800 in which an electronic device provides a recommended voice command. The user interface 800 can include text indicating the user's voice input 810, text indicating the ingredients 815, text indicating instructions 820. Certain instructions can be performed, or assisted by an external electronic device. Accordingly, the user interface 800 includes buttons 881 and 883 that can cause external electronic device(s) to perform the indicated function.

For example, the user interface 800 may include a response screen 801 (e.g., a response message) for the user's voice input 810. For example, an electronic device may display a recommended voice command in a partial region of the message 801. For example, FIG. 8F shows the user interface 800 provided as a result of the user's voice input 810 of "tell me the recipe for Kimchi Ramen". For example, the user interface 800 may include the information 810 about the user's voice input, the information 815 and 820 about a result of processing a voice input, and information 880 about a recommended voice command. For example, a first recommended voice command 881 ("pour out 550 ml of water") may be a recommended voice command in response to a part 821 of information included in the user interface 800. A second recommended voice command 883 ("run a 2-minute timer") may be a voice command recommended in response to another part 823 of information included in the user interface 800.

The electronic device may recognize a voice command capable of performing an actual corresponding operation based on information included in the message 801 (or the user interface 800) being provided by the electronic device and may provide the voice command as the recommended voice commands 881 and 883. The electronic device may recommend a proper voice command available for various domains regardless of a domain being currently operated (served), by recognizing a voice command, which is capable of being performed, based on content included in the message 801 and providing the voice command as the recommended voice command.

Figure 9:
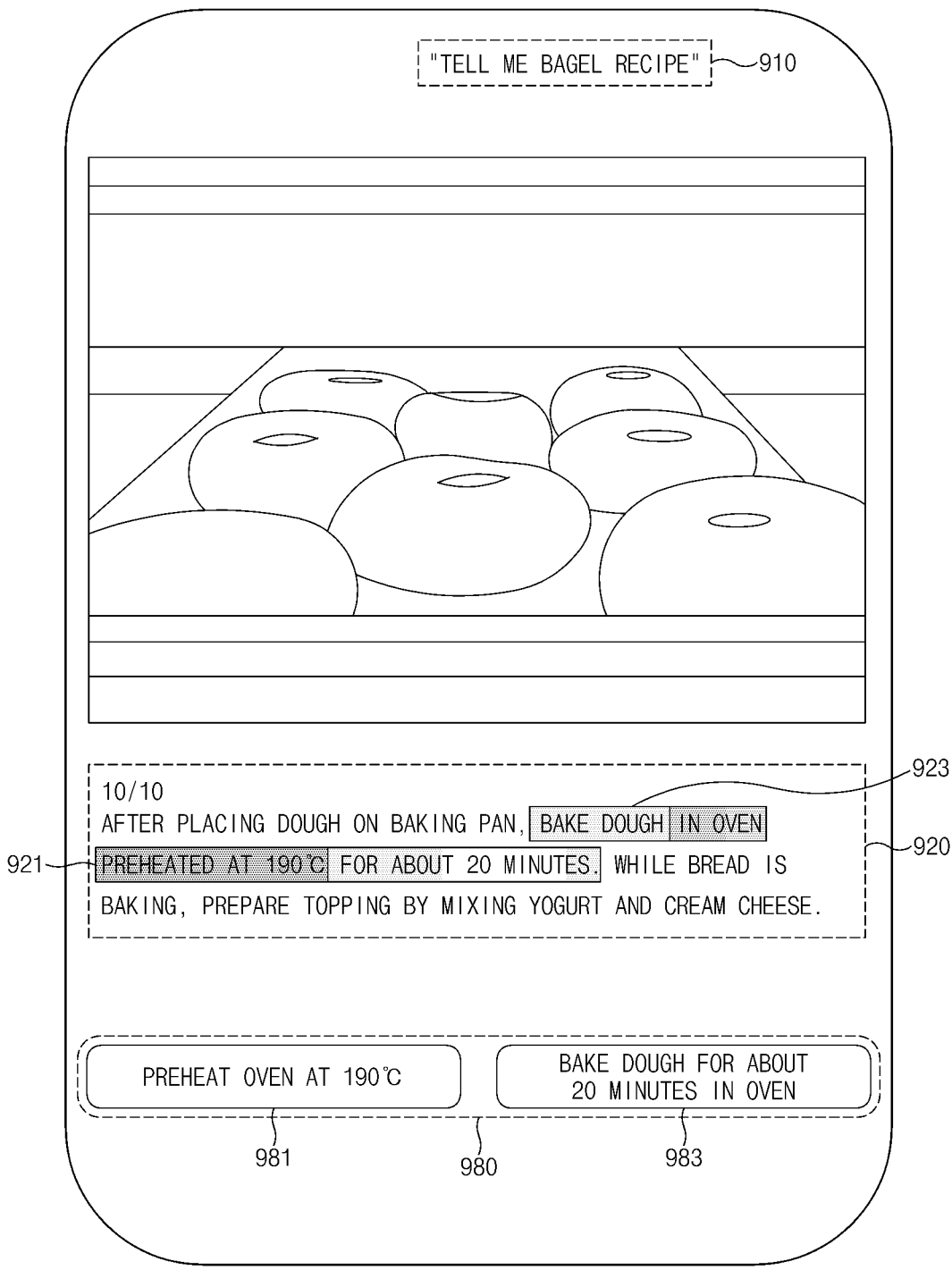
FIG. 9 is an example of a user interface in which an electronic device provides a recommended voice command, according to an embodiment.

FIG. 9 shows an example of a user interface in which an electronic device provides a recommended voice command. In FIG. 9, the user has made a voice input of "Tell me a bagel recipe." The interface includes the user's voice input translated to text 910, with various actions 920. In this example, the oven is an external electronic device that can be controlled by the electronic device. Accordingly, the interface includes buttons that cause the oven to pre-heat 981 and bake 983.

According to an embodiment, an electronic device (e.g., the electronic device 101, 102, or 104 of FIG. 1, the server 108 of FIG. 1, the user terminal 201 of FIG. 2, the intelligence server 300 of FIG. 2, the electronic device 500 of FIG. 5, the electronic device 600 of FIG. 6, the recommended voice command providing module 710 of FIG. 7, or the voice assistant server 720 of FIG. 7) may provide a user interface 900 (e.g., a response message to a user's voice input) in response to a user's voice input ("tell me a bagel recipe"). For example, the user interface 900 may include information 910 about the user's voice input and search information 920 (e.g., recipe information) corresponding to the user's voice input. For example, the search information 920 may include text information including at least one word, sentence, and/or paragraph. The user interface 900 may include voice command recommendation information 980. The electronic device may first provide the information 910 about the user's voice input and the search information 920 corresponding to the user's voice input to the user interface 900, may provide the voice command recommendation information 980 to the user interface 900 after an operation of providing a recommended voice command described below is performed, or may initially provide the user interface 900 including the information 910 about the user's voice input, the search information 920, and the voice command recommendation information 980. For example, the electronic device may provide the user interface 900 including the information 910 about the user's voice input, the search information 920, and the voice command recommendation information 980, in response to the user's voice input.

The electronic device may split information included in at least part (e.g., the search information 920) included in the user interface 900 into action-unit sentences. The electronic device may split information included in at least part included in the user interface 900 into action-unit sentences through POS tagging or dependency parsing. For example, the electronic device may split a sentence of "after placing dough on a baking pan, bake the dough in an oven preheated at 190° C. for about 20 minutes, please.", which is included in the search information 920, into a plurality of sentences of "after placing dough on a baking pan", "in an oven preheated at 190° C., and "bake the dough in the oven for about 20 minutes".

The electronic device may convert the sentence, which is split in units of action, in a form of a command. For example, the electronic device may convert "after placing dough on a baking pan" into "place dough on a baking pan", may convert "an oven preheated at 190° C." into "preheat an oven at 190° C.", and may convert "bake dough in the oven for about 20 minutes, please" into "bake dough in the oven for about 20 minutes". According to an embodiment, when an incomplete word and/or sentence is entered, the electronic device may generate or utilize a learning model, which is supported by the voice assistant system and which generates, as an output, a sentence predicted to perform an operation corresponding to the input word and/or sentence.

The electronic device may recognize the corresponding domain and/or intent for each of the converted sentences. The electronic device may make a request for information of a domain and/or intent corresponding to each of sentences split in units of action to an external electronic device (e.g., a voice assistant system (e.g., an NL module)), and may receive a response (e.g., a response including information of the corresponding domain and/or intent or a response indicating that there is no corresponding domain and/or intent) to the request from the external electronic device. For example, the electronic device may recognize that there is no domain and intent for performing a corresponding operation (service) for "place dough on a baking pan". For example, the electronic device may recognize a domain (e.g., smartthings or oven) and intent (e.g., preheat the oven at 190° C.) for performing an operation of "DeviceControl/PreheatOven" corresponding to "preheat the oven at 190° C.", and may recognize a domain (e.g., smartthings or oven) and intent (e.g., bake dough for 20 minutes) for performing an operation of "DeviceControl/BakeOven" corresponding to "bake dough for about 20 minutes in the oven".

The electronic device may determine whether an operation (service) corresponding to the recognized domain and/or intent is capable of being performed. For example, the electronic device may determine whether a user owns a device performing an operation corresponding to the recognized domain and/or intent, based on user information (e.g., user account information). For example, the electronic device may determine whether an operation corresponding to the recognized domain and/or intent is capable of being performed, based on information related to the electronic device and/or information related to an external electronic device (e.g., an oven).

According to an embodiment, when determining that an operation (service) corresponding to the recognized domain and/or intent is capable of being performed, the electronic device may provide a voice command corresponding to the corresponding operation as a recommended voice command. For example, the electronic device may provide "preheat the oven at 190° C." as a voice command corresponding to the domain and intent of "DeviceControl/PreheatOven", and may provide "bake dough in the oven for about 20 minutes" as a recommended voice command corresponding to the domain and intent of "DeviceControl/BakeOven". For example, the electronic device may provide a first recommended voice command 981 corresponding to a first portion 921 of the information 920 and a second recommended voice command 983 corresponding to a second portion 923 of the information 920 based on the information 920 included in the user interface 900 (e.g., a response message) being provided.

The electronic device may provide a recommended voice command for a domain (e.g., a domain for controlling an external electronic device (e.g., an oven)) different from a domain (e.g., a domain for searching for information) related to the user interface 900 being provided, by recommending an available voice command based on information included in the user interface 900 being provided.

Figure 10:
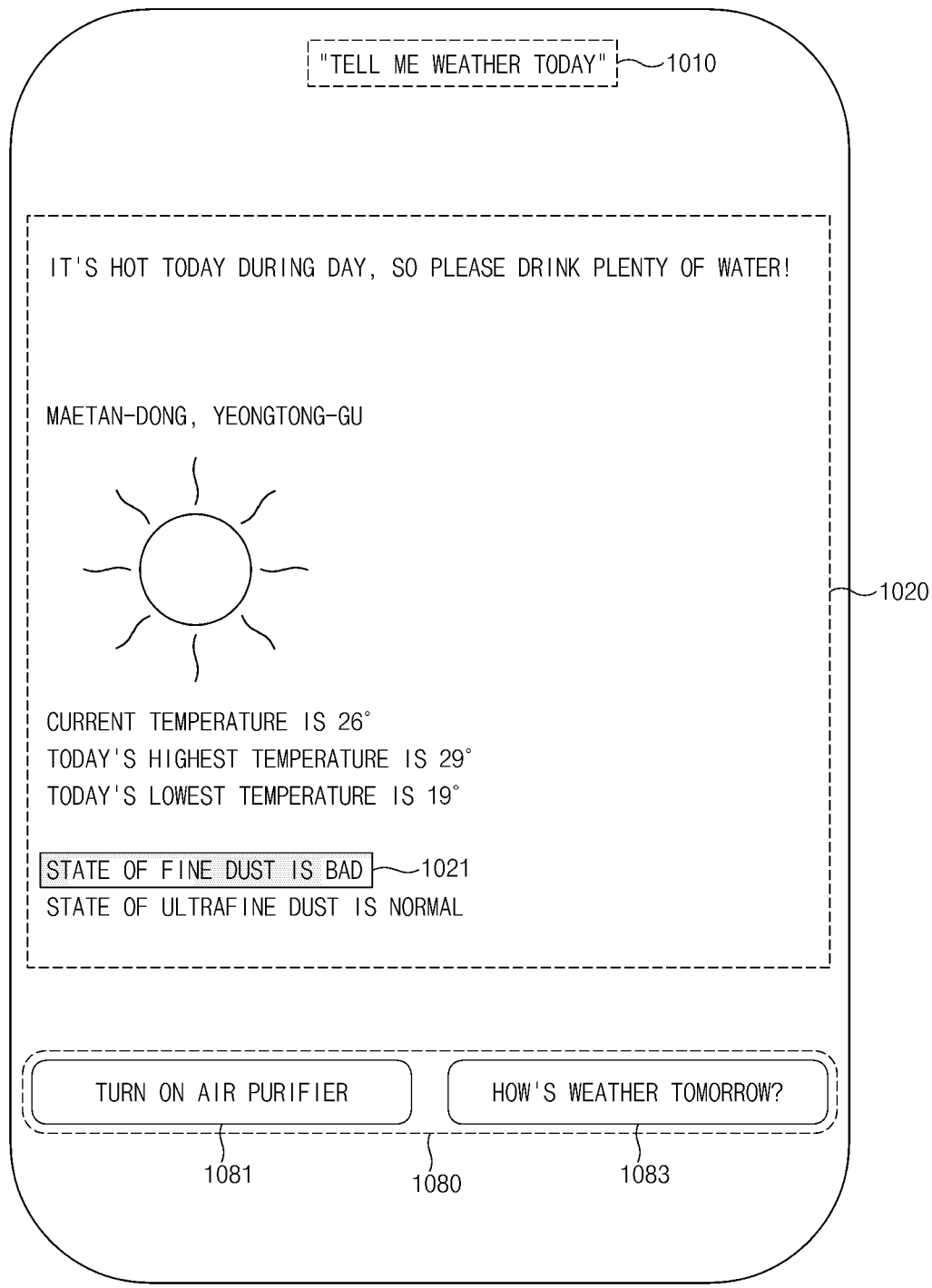
FIG. 10 is an example of a user interface in which an electronic device provides a recommended voice command, according to an embodiment.

FIG. 10 illustrates an example of a user interface through which an electronic device provides a recommended voice command, according to an embodiment. Hereinafter, a description identical or similar to the description given with reference to FIG. 9 is omitted or briefly described.

The interface can be provided in response to a user voice input, "tell me weather today." The interface includes text indicating that user's voice input 1010, information indicating the weather 1020, with highlights of information that can be accommodated with an external electronic device 1021. The interface can also include buttons 1081 and 1083 for controlling an air purifier and asking about the whether the next day.

According to an embodiment, an electronic device (e.g., the electronic device 101, 102, or 104 of FIG. 1, the server 108 of FIG. 1, the user terminal 201 of FIG. 2, the intelligence server 300 of FIG. 2, the electronic device 500 of FIG. 5, the electronic device 600 of FIG. 6, the recommended voice command providing module 710 of FIG. 7, or the voice assistant server 720 of FIG. 7) may provide a user interface 1000 (e.g., a response message to a user's voice input) in response to a user's voice input ("tell me the weather today"). For example, the user interface 1000 may include information 1010 about the user's voice input and search information 1020 (e.g., weather information) corresponding to the user's voice input. The user interface 1000 may include voice command recommendation information 1080.

The electronic device may split information included in at least part (e.g., the search information 1020) included in the user interface 1000 into action-unit sentences. For example, the electronic device may split information included in the search information 1020 into "it's hot today during the day, so please drink plenty of water", "Maetan-dong, Yeongtong-gu", "current temperature is 26° C.", "today's highest temperature is 29° C.", "today's lowest temperature is 19° C.", "a state of fine dust is bad" 1021, and "a state of ultrafine dust is normal".

The electronic device may convert the sentence, which is split in units of action, in a form of a voice command. For example, the electronic device may exclude a sentence incapable of being converted in a form of a voice command from a processing target for providing a recommended voice command. The electronic device may determine whether there is a predefined voice command in a sentence split in units of action. The electronic device may determine whether the split sentence belongs to the predefined pattern. For example, a pattern of the sentence may be determined depending on words included in the sentence and/or the semantic analysis of the sentence. For example, the predefined pattern may include a pattern (e.g., a sentence composed of words (e.g., seconds, minutes, hours) related to numbers and time) related to duration, or a pattern (e.g., a sentences related to dust concentration) related to dust, but is not limited thereto. According to an embodiment, when the sentence belongs to a predefined pattern, the electronic device may recognize a predefined voice command corresponding to the predefined pattern. For example, an electronic device may recognize a pattern related to predefined dust from the sentence "the state of fine dust is bad" and may recognize the predefined voice command of "turn on an air purifier" corresponding to the dust-related pattern. For example, the electronic device may recognize (obtain) the voice command of "turn on the air purifier" from the sentence of "the state of fine dust is bad".

The electronic device may recognize the domain and/or intent corresponding to the voice command. For example, the predefined voice command may correspond to a predefined domain and/or intent. For example, the electronic device may recognize "DeviceControl-TurnOnAirPurifier (dustmode)" (e.g., a domain and/or intent for controlling an external electronic device (an air purifier) 'turn on (an air purifier)') as the domain and/or intent corresponding to a voice command of "turn on an air purifier".

The electronic device may determine whether an operation (service) corresponding to the recognized domain and/or intent is capable of being performed. For example, the electronic device may determine whether an operation corresponding to the recognized domain and/or intent is capable of being performed, based on user information, information related to the electronic device, and/or information related to an external electronic device. For example, the electronic device may determine whether a user owns an air purifier and/or whether the air purifier is in an operable state.

According to an embodiment, when determining that an operation (service) corresponding to the recognized domain and/or intent is capable of being performed, the electronic device may provide a voice command corresponding to the corresponding operation as a recommended voice command. For example, the electronic device may provide "turn on an air purifier", which is activated in response to a voice command corresponding to the domain and/or intent of "DeviceControl-TurnOnAirPurifier (dustmode)", as a recommended voice command 1081. For example, the electronic device may provide a first recommended voice command 1081 corresponding to a portion 1021 of information 1020 based on the information 1020 included in the user interface 1000 (e.g., a response message) being provided. The electronic device may provide a second recommended voice command 1083 related to the user interface 1000 being provided.

According to an embodiment, as well as the second recommended voice command 1083 related to a domain (e.g., a domain for searching for weather) related to the user interface 1000 being provided, the electronic device may provide the first recommended voice command 1081 for a domain (e.g., a domain for controlling an external electronic device (e.g., an air purifier)) different from a domain related to the user interface 1000 being provided, by recommending an available voice command based on information included in the user interface 1000 being provided.

According to an embodiment disclosed in this specification, an electronic device may include a display, a communication circuit, a memory, and at least one processor operatively connected to the display, the communication circuit, and the memory. The memory may store instructions, when executed by the at least one processor, cause the electronic device to split a sentence included in a message, which is being provided to a user by the electronic device, in units of action, to convert the split action-unit sentence in a form of a voice command, to determine whether an operation corresponding to the converted voice command is capable of being performed, based on at least one of user information, information related to the electronic device, and information related to an external execution device connected to the electronic device, and to provide information of at least one recommended voice command corresponding to an operation capable of being performed, based on the determination.

The instructions may, when executed, cause the electronic device to determine whether a predefined voice command matched with the action-unit sentence is present, and to convert the action-unit sentence into the predefined voice command when the matched predefined voice command is present.

The instructions may, when executed, cause the electronic device to recognize at least one of a domain, intent, and a slot, which are related to the converted voice command, and to determine whether an operation corresponding to the converted voice command is capable of being performed, based on the recognized at least one of the domain, the intent, and the slot.

The instructions may, when executed, cause the electronic device to recognize the domain based on a user preference, a usage history of a user, and a predetermined category.

The instructions may, when executed, cause the electronic device to select at least part of the message, and to perform the splitting, the converting, the determining, and the providing on the selected at least part of the message.

The instructions may, when executed, cause the electronic device to perform natural language (NL) analysis on a converted voice command, and to determine whether an operation corresponding to the converted voice command is capable of being performed, by performing input evaluation based on the NL analysis result.

The instructions may, when executed, cause the electronic device to split the sentence included in the message in units of action through part of speech (POS) tagging or dependency parsing.

The message may include at least one of a screen displayed on the display, a voice output by the electronic device, and a response to a voice input of a user.

According to an embodiment disclosed in this specification, an electronic device may include a communication circuit, a memory, and at least one processor operatively connected to the communication circuit and the memory. The memory may store instructions, when executed by the at least one processor, cause the electronic device to receive information about a message, which is being provided by an external electronic device, from the external electronic device through the communication circuit, to split a sentence included in the message in units of action based on the information about the message, to convert the split action-unit sentence in a form of a voice command, to determine whether an operation corresponding to the converted voice command is capable of being performed, based on at least one of user information, information related to the external electronic device, and information related to an external execution device connected to the external electronic device, to determine at least one recommended voice command corresponding to an operation capable of being performed, based on the determination, and to provide information about the at least one recommended voice command to the external electronic device through the communication circuit.

The instructions may, when executed, cause the electronic device to determine whether a predefined voice command matched with the action-unit sentence is present, and to convert the action-unit sentence into the predefined voice command when the matched predefined voice command is present.

The instructions may, when executed, cause the electronic device to recognize at least one of a domain, intent, and a slot, which are related to the converted voice command, and to determine whether an operation corresponding to the converted voice command is capable of being performed, based on the recognized at least one of the domain, the intent, and the slot.

The instructions may, when executed, cause the electronic device to select at least part of the message, and to perform the splitting, the converting, the determining, and the providing on the selected at least part of the message.

The instructions may, when executed, cause the electronic device to perform natural language (NL) analysis on a converted voice command, and to determine whether an operation corresponding to the converted voice command is capable of being performed, by performing input evaluation based on the NL analysis result.

The instructions may, when executed, cause the electronic device to split a sentence included in a message in units of action through POS tagging or dependency parsing.

Figure 11:
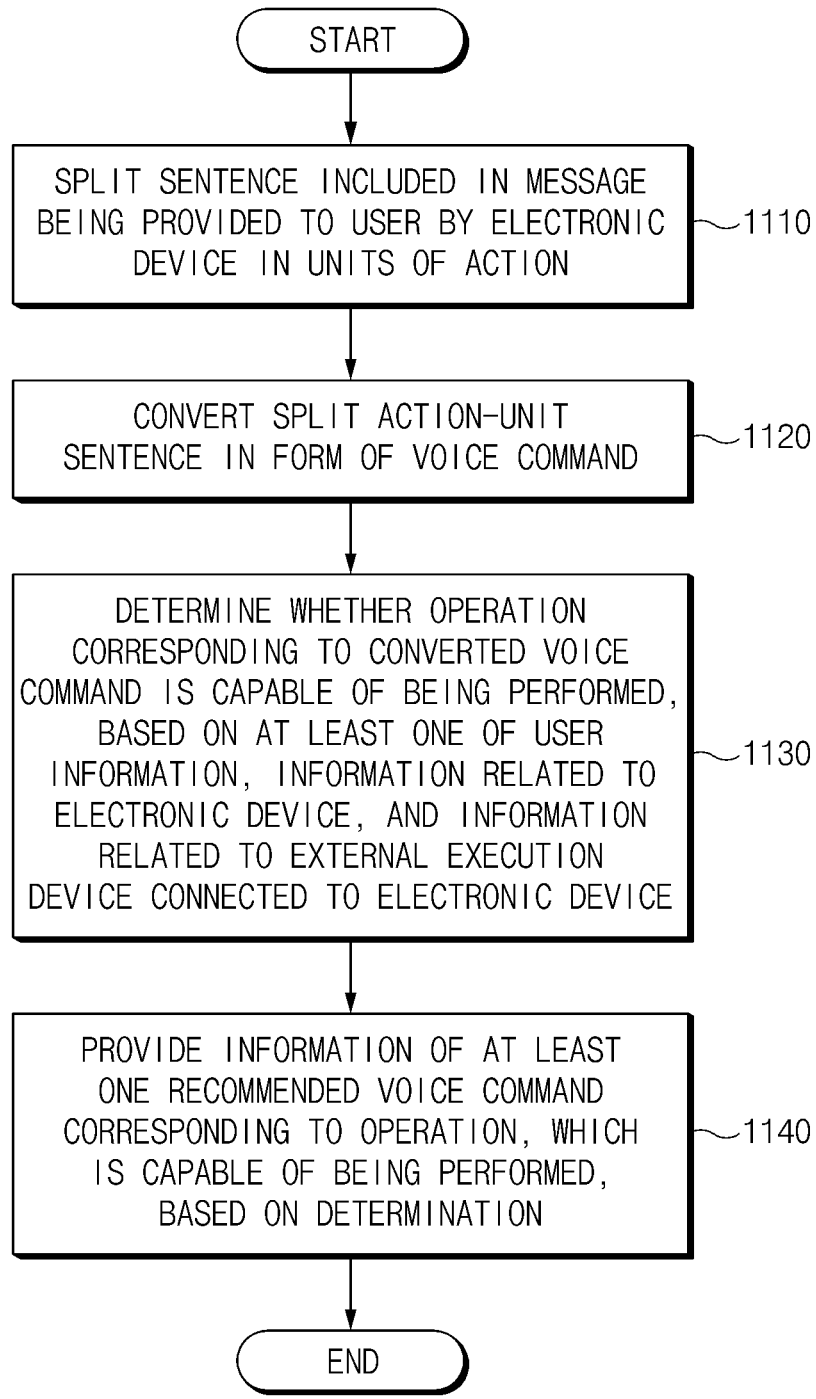
FIG. 11 is a flowchart of a voice command recommending method of an electronic device, according to an embodiment.

FIG. 11 is a flowchart of a voice command recommending method of an electronic device, according to an embodiment.

According to an embodiment, in operation 1110, an electronic device (e.g., the electronic device 101 of FIG. 1, the user terminal 201 of FIG. 2, or the electronic device 500 of FIG. 5) may split a sentence included in a message being provided to a user in units of action. The message may include at least one of a screen displayed on a display of the electronic device, a voice output by the electronic device, and a response to a user's voice input. For example, the message may include various types of information being provided to the user by the electronic device, a response to a user input, and/or a feedback.

The action may correspond to one individual operation or behavior. The electronic device may split at least some sentences included in the message into action-unit sentences through POS tagging or dependency parsing.

According to an embodiment, in operation 1120, the electronic device may convert each of the split action-unit sentences in a form of a voice command. For example, the electronic device may convert the ending of each sentence split in units of action into an expression corresponding to a command. The electronic device may recognize sentences incapable of being converted in a form of a voice command by analyzing the meaning of the sentence. The electronic device may exclude sentences incapable of being converted in a form of a voice command from a processing target for providing a recommended voice command.

The electronic device may determine whether there is a predefined voice command matching the sentence split in units of action. According to an embodiment, when the predefined voice command matching the sentence split in units of action is present, the electronic device may convert the corresponding sentence into the predefined voice command.

According to an embodiment, in operation 1130, the electronic device may determine whether an operation corresponding to the converted voice command is capable of being performed, based on at least one of user information, information related to the electronic device, and information related to an external execution device connected to the electronic device. For example, the external execution device may be a device, which is connected to an electronic device (e.g., a user terminal) and/or an external electronic device (e.g., a voice assistant server) (e.g., the electronic device 102 or 104 of FIG. 1, the server 108 of FIG. 1, the intelligence server 300 of FIG. 2, the electronic device 600 of FIG. 6, the recommended voice command providing module 710 of FIG. 7, or the voice assistant server 720 of FIG. 7) or is registered in a user account, and may include a device capable of actually performing an operation corresponding to a voice command. For example, the electronic device may receive information (e.g., an identifier, capability information, and/or type information of an external execution device) related to the external execution device from an external server (e.g., an external IoT server or a voice assistant server) and may determine whether an operation corresponding to the converted voice command is capable of being performed, based on the information.

For example, the electronic device may perform NL processing on the converted voice command, and may perform input evaluation on the NL-processed voice command. For example, the electronic device may recognize the domain, intent, and/or slot for performing an operation corresponding to a voice command by preforming NL processing on the converted voice command and may determine whether an operation corresponding to the voice command is capable of being performed based on the result of performing input evaluation, based on the recognized domain, intent, and/or slot. For example, through the input evaluation, the electronic device may determine whether a user has a device for performing an operation corresponding to the voice command, based on user information (e.g., user account information). For example, through the input evaluation, the electronic device may determine whether the electronic device or the external electronic device connected to the electronic device has the ability to perform an operation corresponding to a voice command, or may determine whether the electronic device or the external execution device connected to the electronic device is in a state in which the user is capable of performing an operation corresponding to the voice command.

According to an embodiment, in operation 1140, the electronic device may provide information of at least one voice command corresponding to an operation, which is capable of being performed based on the determination, as information of a recommended voice command. For example, the electronic device may provide a user interface including a recommended voice command corresponding to an operation capable of being actually performed.

The electronic device may recommend a proper voice command available for various domains regardless of a domain being currently operated (served), by recognizing a voice command, which is capable of actually performing an operation, based on content included in a message being provided by the electronic device and providing the voice command as the recommended voice command.

Figure 12:
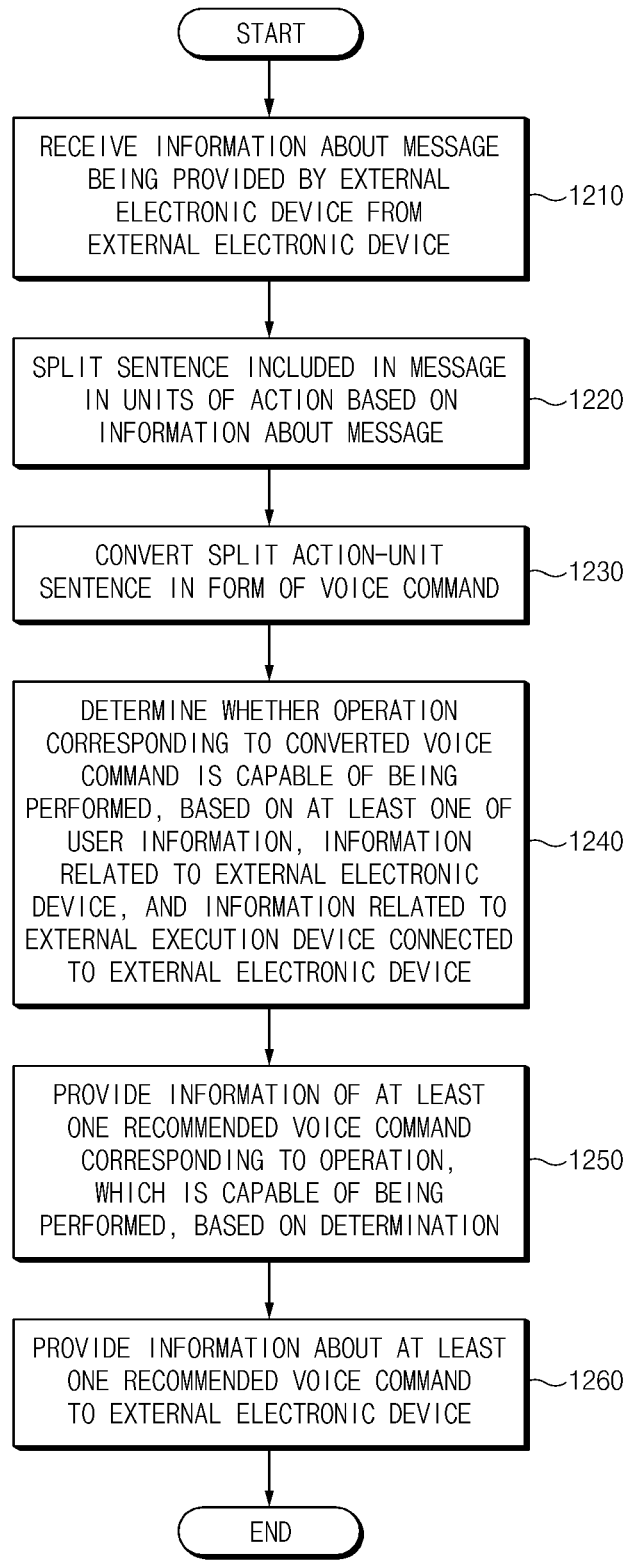
FIG. 12 is a flowchart of a voice command recommending method of an electronic device, according to an embodiment.

FIG. 12 is a flowchart of a voice command recommending method of an electronic device, according to an embodiment. Hereinafter, a description identical or similar to the description given with reference to FIG. 11 is omitted or briefly described.

According to an embodiment, in operation 1210, an electronic device (e.g., the electronic device 102 or 104 of FIG. 1, the server 108 of FIG. 1, the intelligence server 300 of FIG. 2, the electronic device 600 of FIG. 6, the recommended voice command providing module 710 of FIG. 7, or the voice assistant server 720 of FIG. 7) may receive information about a message being provided by an external electronic device from the external electronic device (e.g., the electronic device 101 of FIG. 1, the user terminal 201 of FIG. 2, or the electronic device 500 of FIG. 5). For example, the message may include various types of information being provided to the user by the external electronic device, a response to a user input, and/or a feedback.

According to an embodiment, in operation 1220, the electronic device may split a sentence included in the message in units of action based on the information about the message. The electronic device may split at least some sentences included in the message into action-unit sentences through POS tagging or dependency parsing.

According to an embodiment, in operation 1230, the electronic device may convert each of the split action-unit sentences in a form of a voice command. For example, the electronic device may convert the ending of each sentence split in units of action into an expression corresponding to a command. The electronic device may determine whether there is a predefined voice command matching the sentence split in units of action. When the predefined voice command matching the sentence split in units of action is present, the electronic device may convert the corresponding sentence into the predefined voice command.

According to an embodiment, in operation 1240, the electronic device may determine whether an operation corresponding to the converted voice command is capable of being performed, based on at least one of user information, information related to an external electronic device (e.g., a user terminal), and information related to an external execution device connected to the external electronic device. For example, the external execution device may be a device, which is connected to an electronic device (e.g., a voice assistant server) and/or an external electronic device (e.g., a user terminal (e.g., the electronic device 101 of FIG. 1, the user terminal 201 of FIG. 2, or the electronic device 500 of FIG. 5)) or is registered in a user account, and may include a device capable of actually performing an operation corresponding to a voice command. For example, the electronic device may receive information (e.g., an identifier, capability information, and/or type information of an external execution device) related to the external execution device from the external electronic device (e.g., a user terminal) or an external server (e.g., an external IoT server) and may determine whether an operation corresponding to the converted voice command is capable of being performed, based on the information.

For example, the electronic device may perform NL processing on the converted voice command, and may perform input evaluation on the NL-processed voice command. For example, the electronic device may recognize the domain, intent, and/or slot for performing an operation corresponding to a voice command by preforming NL processing on the converted voice command and may determine whether an operation corresponding to the voice command is capable of being performed based on the result of performing input evaluation, based on the recognized domain, intent, and/or slot.

The electronic device may perform an NL processing operation and an input evaluation operation through a second external electronic device (e.g., an integrated intelligence server (e.g., a voice assistant server), or an integrated intelligence system (e.g., a voice assistant system)). For example, the electronic device may provide information related to the converted voice command to the second external electronic device and may receive information about the result of performing NL processing and input evaluation on the voice command from the second external electronic device.

According to an embodiment, in operation 1250, the electronic device may determine information of at least one recommended voice command corresponding to an operation, which is capable of being performed, based on the determination. For example, the electronic device may determine that at least one voice command capable of performing an operation corresponding to an actual voice command among the converted voice commands is a recommended voice command, based on the result of the NL processing and the input evaluation.

According to an embodiment, in operation 1260, the electronic device may provide information about at least one recommended voice command to an external electronic device. For example, the electronic device may provide a user with a recommended voice command corresponding to an operation capable of being actually performed through the external electronic device.

The electronic device may recommend a proper voice command available for various domains regardless of a domain being currently operated (served), by recognizing a voice command, which is capable of actually performing an operation, based on content included in a message being provided by the external electronic device and providing the voice command as the recommended voice command.

Figure 13:
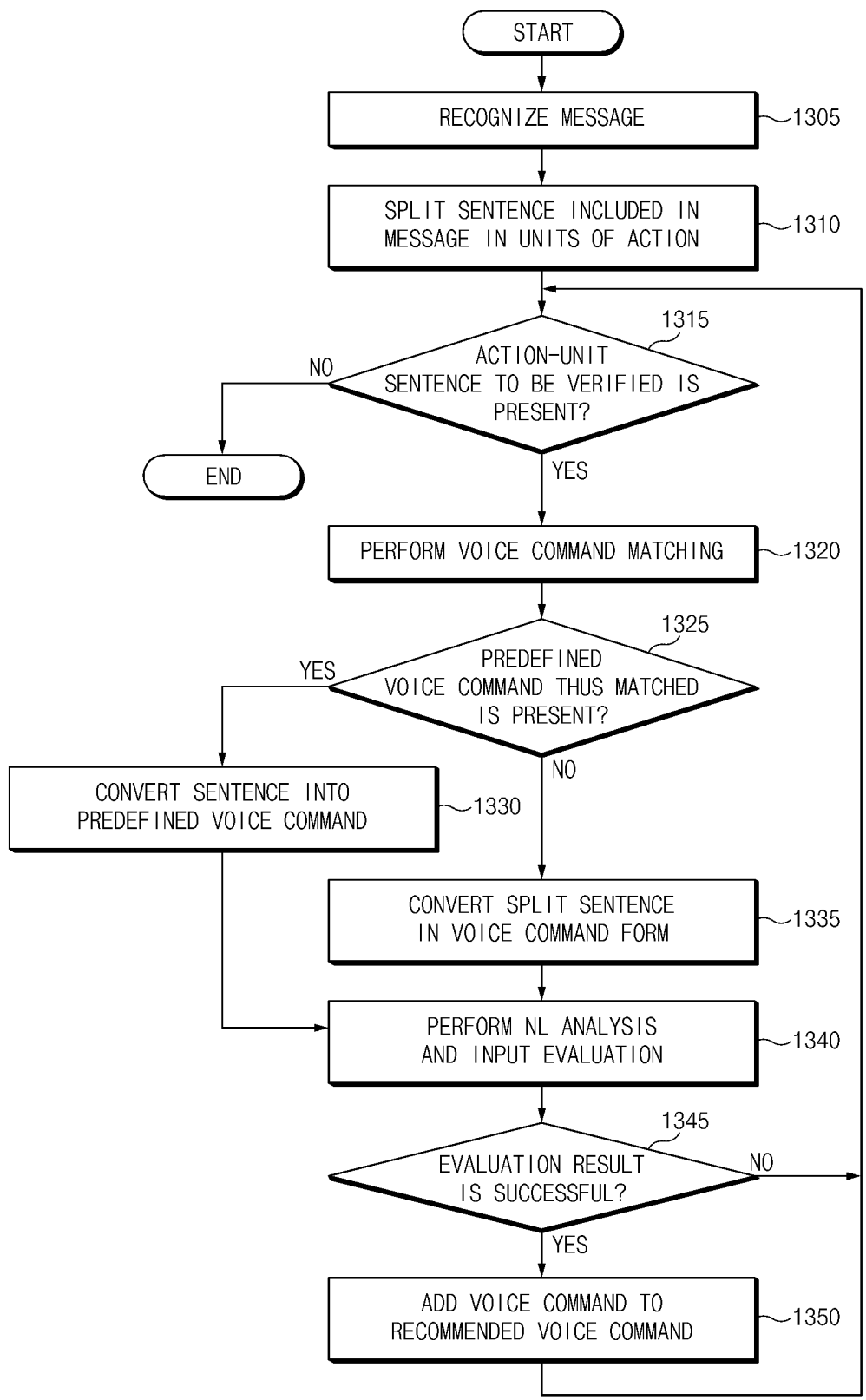
FIG. 13 is a flowchart of a voice command recommending method of an electronic device, according to an embodiment.

FIG. 13 is a flowchart of a voice command recommending method of an electronic device, according to an embodiment.

According to an embodiment, in operation 1305, an electronic device (e.g., the electronic device 101, 102, or 104 of FIG. 1, the server 108 of FIG. 1, the user terminal 201 of FIG. 2, the intelligence server 300 of FIG. 2, the electronic device 500 of FIG. 5, the electronic device 600 of FIG. 6, the recommended voice command providing module 710 of FIG. 7, or the voice assistant server 720 of FIG. 7), may recognize a message. The message may include at least one of a screen displayed on a display of the electronic device, a voice output by the electronic device, and a response to a user's voice input. For example, the message may include various types of information being provided to the user by the electronic device, a response to a user input, and/or a feedback.

According to an embodiment, in operation 1310, the electronic device may split a sentence included in the message in units of action. The action may correspond to one individual operation or behavior. The electronic device may split at least some sentences included in the message into action-unit sentences through POS tagging or dependency parsing.

According to an embodiment, in operation 1315, the electronic device may determine whether an action-unit sentence to be verified is present. According to an embodiment, when the action-unit sentence to be verified is present, the electronic device may perform operation 1320. When there is no action-unit sentence to be verified, the electronic device may terminate an operation of providing a recommended voice command.

According to an embodiment, in operation 1320, the electronic device may perform voice command matching. For example, the electronic device may recognize a pattern (e.g., a sentence pattern including a time-related meaning or a pattern related to dust) of each sentence split in units of action, and may recognize a predefined voice command corresponding to the recognized pattern. For example, the electronic device may recognize the pattern of the sentence based on words included in the sentence and/or the semantic analysis of the sentence.

According to an embodiment, in operation 1325, the electronic device may determine whether a predefined voice command matching an action-unit sentence is present. According to an embodiment, when the predefined voice command matching the action-unit sentence is present, the electronic device may perform operation 1330. When the predefined voice command thus matched is not present, the electronic device may perform operation 1335.

According to an embodiment, in operation 1330, the electronic device may convert an action-unit sentence into a predefined voice command.

According to an embodiment, in operation 1335, the electronic device may convert the split action-unit sentence in a voice command form. For example, the electronic device may convert the ending of each sentence split in units of action in a form corresponding to a command. The electronic device may convert a sentence in a voice command form by using a model (e.g., an artificial intelligence learning model) for converting the sentence split in units of action into a supportable voice command.

According to an embodiment, in operation 1340, the electronic device may perform NL analysis and input evaluation. For example, the electronic device may perform NL analysis and input evaluation on a voice command converted through operation 1330 or operation 1335. For example, the electronic device may recognize a domain, intent, and/or slot for performing an operation corresponding to a voice command by preforming NL processing on the converted voice command and may perform input evaluation to determine whether an operation corresponding to the voice command is capable of being performed, based on the recognized domain, intent, and/or slot. For example, through the input evaluation, the electronic device may determine whether a user has a device for performing an operation corresponding to the voice command, based on user information (e.g., user account information). For example, through the input evaluation, the electronic device may determine whether the electronic device or the external electronic device connected to the electronic device has the ability to perform an operation corresponding to a voice command, or may determine whether the electronic device or the external electronic device connected to the electronic device is capable of performing an operation corresponding to the voice command.

According to an embodiment, 1345 operation, the electronic device may determine whether the result of input evaluation is successful. For example, when the operation corresponding to the voice command is capable of being performed, the electronic device may determine that the result of input evaluation is successful. According to an embodiment, when the result of input evaluation is successful, the electronic device may perform operation 1350. When the result of input evaluation is not successful, the electronic device may perform operation 1315. According to an embodiment, when the result of NL processing or input evaluation fails, the electronic device may exclude the corresponding voice command from the recommended voice command. For example, when the result of NL processing indicates that the corresponding domain, intent, and/or slot is incapable of being recognized, the electronic device may exclude the corresponding voice command from a target for providing the recommended voice command. For example, the electronic device may determine whether a condition (e.g., whether a user has a device and/or whether the device supports the operation) for performing an operation corresponding to a voice command is satisfied, through input evaluation. When the condition is not satisfied, the electronic device may exclude the corresponding voice command from the recommended voice command.

According to an embodiment, in operation 1350, the electronic device may add a voice command to the recommended voice command when the result of input evaluation is successful. For example, when the result of input evaluation is successful, it may mean that an operation corresponding to the corresponding voice command is capable of being actually performed. For example, when the condition (e.g., whether a user has a device and/or whether the device supports the operation) for performing an operation corresponding to a voice command is satisfied, the electronic device may add the corresponding voice command to the recommended voice command.

The electronic device may provide the recommended voice command to the user. For example, the electronic device may display the recommended voice command on a screen, or may output information of the recommended voice command by using a sound.

The electronic device may provide an available voice command as a recommended voice command depending on a current situation by adding a voice command to the recommended voice command when the result of input evaluation is successful. Moreover, the electronic device may recommend a proper voice command available for various domains regardless of a domain being currently operated (served), by recognizing a voice command, which is capable of actually performing an operation, based on content included in a message being provided by the external electronic device and providing the voice command as the recommended voice command.

According to an embodiment disclosed in this specification, a voice command recommending method of an electronic device may include splitting a sentence included in a message, which is being provided to a user by the electronic device, in units of action, converting the split action-unit sentence in a form of a voice command, determining whether an operation corresponding to the converted voice command is capable of being performed, based on at least one of user information, information related to the electronic device, and information related to an external execution device connected to the electronic device, and providing information of at least one recommended voice command corresponding to an operation capable of being performed, based on the determination.

The converting may include determining whether a predefined voice command matched with the action-unit sentence is present, and converting the action-unit sentence into the predefined voice command when the matched predefined voice command is present.

The determining may include recognizing at least one of a domain, intent, and a slot, which are related to the converted voice command, and determining whether an operation corresponding to the converted voice command is capable of being performed, based on the recognized at least one of the domain, the intent, and the slot.

The determining may include performing NL analysis on a converted voice command, and determining whether an operation corresponding to the converted voice command is capable of being performed, by performing input evaluation based on the NL analysis result.

The splitting may include splitting the sentence included in the message in units of action through POS tagging or dependency parsing.

According to an embodiment disclosed in this specification, a voice command recommending method of an electronic device may include receiving information about a message, which is being provided by an external electronic device, from the external electronic device, splitting a sentence included in the message in units of action based on the information about the message, converting the split action-unit sentence in a form of a voice command, determining whether an operation corresponding to the converted voice command is capable of being performed, based on at least one of user information, information related to the external electronic device, and information related to an external execution device connected to the external electronic device, determining at least one recommended voice command corresponding to an operation capable of being performed, based on the determination, and providing the external electronic device with information about the at least one recommended voice command.

According to certain embodiments, an electronic device comprises: a display; a communication circuit; a memory; and at least one processor operatively connected to the display, the communication circuit, and the memory, wherein the memory stores instructions, when executed by the at least one processor, cause the electronic device to perform a plurality of operations, the plurality of operations comprising: splitting a sentence included in a message in units of action, the sentence being provisioned to a user by the electronic device, thereby resulting in a split action-unit sentence; converting the split action-unit sentence into a form of a voice command; determining whether an operation corresponding to the voice command can be performed, based on at least one of user information, information related to the electronic device, and information related to an external execution device connected to the electronic device; and providing at least one recommended voice command corresponding to the operation, based on the determination.

According to certain embodiments, the plurality of operations further comprises: determining whether a predefined voice command matched with the split action-unit sentence is present; and when the predefined voice command is present, convert the split action-unit sentence into the predefined voice command.

According to certain embodiments, the plurality of operations further comprises: recognizing at least one of a domain, intent, and a slot, which are related to the voice command; and determining whether the operation corresponding to the voice command is capable of being performed, based on the recognized at least one of the domain, the intent, and the slot.

According to certain embodiments, the plurality of operations further comprises: recognizing the domain based on a user preference, a usage history of a user, and a predetermined category.

According to certain embodiments, the plurality of operations further comprises: selecting at least part of the message; and splitting, converting, determining, and providing based on the selected at least part of the message.

According to certain embodiments, the plurality of operations further comprises: performing natural language (NL) analysis on the voice command; and determining whether the operation corresponding to the voice command is capable of being performed, by performing input evaluation based on the NL analysis result.

According to certain embodiments, the plurality of operations further comprises: splitting the sentence in the message into units of action through part of speech (POS) tagging or dependency parsing.

According to certain embodiments, the message includes at least one of a screen displayed on the display, a voice output by the electronic device, and a response to a voice input of the user.

According to certain embodiments, an electronic device comprises: a communication circuit; a memory; and at least one processor operatively connected to the communication circuit and the memory, wherein the memory stores instructions, when executed by the at least one processor, cause the electronic device to perform a plurality of operations, the plurality of operations comprising: receiving information about a message, wherein the message is provided by an external electronic device, from the external electronic device through the communication circuit; splitting a sentence included in the message in units of action based on the information about the message, thereby resulting in a split action-unit sentence; converting the split action-unit sentence into a form of a voice command; determining whether an operation corresponding to the voice command can be performed, based on at least one of user information, information related to the external electronic device, and information related to an external execution device connected to the external electronic device; determining at least one recommended voice command corresponding to the operation, based on the determination; and providing the at least one recommended voice command to the external electronic device through the communication circuit.

According to certain embodiments, the plurality of operations further comprises: determine whether a predefined voice command matched with the split action-unit sentence is present; and when the matched predefined voice command is present, convert the spilt action-unit sentence into the predefined voice command.

According to certain embodiments, the plurality of operations further comprises: recognizing at least one of a domain, intent, and a slot, which are related to the voice command; determining whether the operation corresponding to the voice command is capable of being performed, based on the recognized at least one of the domain, the intent, and the slot.

According to certain embodiments, the plurality of operations further comprises: selecting at least part of the message; and splitting, converting, determining, and providing based on the selected at least part of the message.

According to certain embodiments, the plurality of operations further comprises: performing NL analysis on the voice command; and determining whether the operation corresponding to the voice command is capable of being performed, by performing input evaluation based on the NL analysis.

According to certain embodiments, the plurality of operations further comprises: splitting the sentence included in the message in units of action through POS tagging or dependency parsing.

According to certain embodiments, a voice command recommending method of an electronic device comprises: splitting a sentence included in a message in units of action, the sentence being provisioned to a user by the electronic device, thereby resulting in a split action-unit sentence; converting the split action-unit sentence into a form of a voice command; determining whether an operation corresponding to the voice command can be performed, based on at least one of user information, information related to the electronic device, and information related to an external execution device connected to the electronic device; and providing at least one recommended voice command corresponding to the operation, based on the determination.

According to certain embodiments, converting includes: determining whether a predefined voice command matched with the split action-unit sentence is present; and when the predefined voice command is present, converting the split action-unit sentence into the predefined voice command.

According to certain embodiments, determining includes: recognizing at least one of a domain, intent, and a slot, which are related to the voice command; and determining whether the operation corresponding to the voice command is capable of being performed, based on the recognized at least one of the domain, the intent, and the slot.

According to certain embodiments, determining includes: performing NL analysis on the voice command; and determining whether the operation corresponding to the voice command is capable of being performed, by performing input evaluation based on the NL analysis.

According to certain embodiments, splitting includes: splitting the sentence in the message into units of action through POS tagging or dependency parsing.

According to certain embodiments, a voice command recommending method of an electronic device, comprises: receiving information about a message, wherein the message is provided by an external electronic device, from the external electronic device; splitting a sentence included in the message in units of action based on the information about the message, thereby resulting in a split action-unit sentence; converting the split action-unit sentence in a form of a voice command; determining whether an operation corresponding to the voice command can be performed, based on at least one of user information, information related to the external electronic device, and information related to an external execution device connected to the external electronic device; determining at least one recommended voice command corresponding to the operation, based on the determination; and providing the external electronic device the at least one recommended voice command.

The electronic device according to certain embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that certain embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with certain embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, The module may be implemented in a form of an application-specific integrated circuit (ASIC).

Certain embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to certain embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to certain embodiments, each component (e.g., a module or a program) of the above-described components may include a single entity or multiple entities, and some of the multiple entities may be separately disposed in different components. According to certain embodiments, one or more of the above-described components may be omitted, or one or more other components may be added. Alternatively or additionally, a plurality of components (e.g., modules or programs) may be integrated into a single component. In such a case, according to certain embodiments, the integrated component may still perform one or more functions of each of the plurality of components in the same or similar manner as they are performed by a corresponding one of the plurality of components before the integration. According to certain embodiments, operations performed by the module, the program, or another component may be carried out sequentially, in parallel, repeatedly, or heuristically, or one or more of the operations may be executed in a different order or omitted, or one or more other operations may be added.

What is claimed is:

1. An electronic device comprising:
   a display;
   a communication circuit;
   a memory; and at least one processor operatively connected to the display, the communication circuit, and the memory, wherein the memory stores instructions, when executed by the at least one processor, cause the electronic device to perform a plurality of operations, the plurality of operations comprising:

receiving a voice input, the voice input including a request;

generating a responding message to the voice input, the responding message answering the request;

splitting a sentence included in the responding message in units of action, the sentence being provisioned to a user by the electronic device, thereby resulting in a split action-unit sentence;

converting the split action-unit sentence into a form of a voice command;

determining whether an operation corresponding to the voice command can be performed, based on at least one of user information, information related to the electronic device, and information related to an external execution device connected to the electronic device; and providing at least one object indicating a corresponding at least one recommended voice command corresponding to the operation, based on the determination, wherein the object is configured to command the external electronic device to perform the operation.

2. The electronic device of claim 1, wherein the plurality of operations further comprises:

determining whether a predefined voice command matched with the split action-unit sentence is present; and when the predefined voice command is present, convert the split action-unit sentence into the predefined voice command.

3. The electronic device of claim 1, wherein the plurality of operations further comprises:

recognizing at least one of a domain, intent, and a slot, which are related to the voice command; and determining whether the operation corresponding to the voice command is capable of being performed, based on the recognized at least one of the domain, the intent, and the slot.

4. The electronic device of claim 3, wherein the plurality of operations further comprises:

recognizing the domain based on a user preference, a usage history of a user, and a predetermined category.

5. The electronic device of claim 1, wherein the plurality of operations further comprises:

selecting at least part of the responding message; and splitting, converting, determining, and providing based on the selected at least part of the responding message.

6. The electronic device of claim 1, wherein the plurality of operations further comprises:

performing natural language (NL) analysis on the voice command; and determining whether the operation corresponding to the voice command is capable of being performed, by performing input evaluation based on the NL analysis.

7. The electronic device of claim 1, wherein the plurality of operations further comprises:

splitting the sentence in the responding message into units of action through part of speech (POS) tagging or dependency parsing.

8. The electronic device of claim 1, wherein the responding message includes at least one of a screen displayed on the display, a voice output by the electronic device, and a response to a voice input of the user.

9. An electronic device comprising:

a communication circuit;

a memory; and at least one processor operatively connected to the communication circuit and the memory, wherein the memory stores instructions, when executed by the at least one processor, cause the electronic device to perform a plurality of operations, the plurality of operations comprising:

receiving information about a responding message, wherein the responding message answers a request from a voice input, wherein the message is provided by an external electronic device, from the external electronic device through the communication circuit;

splitting a sentence included in the responding message in units of action based on the information about the responding message, thereby resulting in a split action-unit sentence;

converting the split action-unit sentence into a form of a voice command;

determining whether an operation corresponding to the voice command can be performed, based on at least one of user information, information related to the external electronic device, and information related to an external execution device connected to the external electronic device;

determining at least one recommended voice command corresponding to the operation, based on the determination; and providing the at least one recommended voice command to the external electronic device through the communication circuit for display in a corresponding at least one object.

10. The electronic device of claim 9, wherein the plurality of operations further comprises:

determine whether a predefined voice command matched with the split action-unit sentence is present; and when the matched predefined voice command is present, convert the spilt action-unit sentence into the predefined voice command.

11. The electronic device of claim 9, wherein the plurality of operations further comprises:

recognizing at least one of a domain, intent, and a slot, which are related to the voice command;

determining whether the operation corresponding to the voice command is capable of being performed, based on the recognized at least one of the domain, the intent, and the slot.

12. The electronic device of claim 9, wherein the plurality of operations further comprises:

selecting at least part of the responding message; and splitting, converting, determining, and providing based on the selected at least part of the responding message.

13. The electronic device of claim 9, wherein the plurality of operations further comprises:

performing NL analysis on the voice command; and determining whether the operation corresponding to the voice command is capable of being performed, by performing input evaluation based on the NL analysis.

14. The electronic device of claim 9, wherein the plurality of operations further comprises:

splitting the sentence included in the responding message in units of action through POS tagging or dependency parsing.

15. A voice command recommending method of an electronic device, the method comprising:
- receiving a voice input, the voice input including a request:
- generating a responding message to the voice input, the responding message answering the request;
- splitting a sentence included in the responding message in units of action, the sentence being provisioned to a user by the electronic device, thereby resulting in a split action-unit sentence;
- converting the split action-unit sentence into a form of a voice command;
- determining whether an operation corresponding to the voice command can be performed, based on at least one of user information, information related to the electronic device, and information related to an external execution device connected to the electronic device; and
- providing at least one object indicating a corresponding at least one recommended voice command corresponding to the operation, based on the determination, wherein the object is configured to command the external electronic device to perform the operation.

16. The method of claim 15, wherein converting includes:
- determining whether a predefined voice command matched with the split action-unit sentence is present; and
- when the predefined voice command is present, converting the split action-unit sentence into the predefined voice command.

17. The method of claim 15, wherein determining includes:
- recognizing at least one of a domain, intent, and a slot, which are related to the voice command; and
- determining whether the operation corresponding to the voice command is capable of being performed, based on the recognized at least one of the domain, the intent, and the slot.

18. The method of claim 15, wherein determining includes:
- performing NL analysis on the voice command; and
- determining whether the operation corresponding to the voice command is capable of being performed, by performing input evaluation based on the NL analysis.

19. The method of claim 15, wherein splitting includes:
- splitting the sentence in the message into units of action through POS tagging or dependency parsing.

20. A voice command recommending method of an electronic device, the method comprising:
- receiving information about a responding message, wherein the responding message answers a request from a voice input, wherein the message is provided by an external electronic device, from the external electronic device;
- splitting a sentence included in the responding message in units of action based on the information about the message, thereby resulting in a split action-unit sentence;
- converting the split action-unit sentence in a form of a voice command;
- determining whether an operation corresponding to the voice command can be performed, based on at least one of user information, information related to the external electronic device, and information related to an external execution device connected to the external electronic device;
- determining at least one recommended voice command corresponding to the operation, based on the determination; and
- providing the external electronic device the at least one recommended voice command for display in a corresponding at least one object.

* * * * *